United States Patent
Grandidge et al.

(10) Patent No.: US 9,151,897 B2
(45) Date of Patent: Oct. 6, 2015

(54) FUSION SPLICE DEVICE

(71) Applicants: Ryan J. Grandidge, Westerly, RI (US); Rudolph A. Montgelas, West Hartford, CT (US); Adam Murano, Lebanon, CT (US); William Dietz, Branford, CT (US); Alex Richard, Groton, CT (US); Jose Mozota, Markham, CA (US)

(72) Inventors: Ryan J. Grandidge, Westerly, RI (US); Rudolph A. Montgelas, West Hartford, CT (US); Adam Murano, Lebanon, CT (US); William Dietz, Branford, CT (US); Alex Richard, Groton, CT (US); Jose Mozota, Markham, CA (US)

(*) Notice: Subject to any disclaimer, the term of this patent is extended or adjusted under 35 U.S.C. 154(b) by 0 days.

(21) Appl. No.: 14/200,953

(22) Filed: Mar. 7, 2014

(65) Prior Publication Data

US 2015/0247973 A1 Sep. 3, 2015

Related U.S. Application Data

(62) Division of application No. 13/404,927, filed on Feb. 24, 2012, now Pat. No. 8,920,049.

(60) Provisional application No. 61/446,555, filed on Feb. 25, 2011.

(51) Int. Cl.
*G02B 6/255* (2006.01)
*G02B 6/38* (2006.01)
*G02B 6/36* (2006.01)
*G02B 6/00* (2006.01)

(52) U.S. Cl.
CPC ............ *G02B 6/2551* (2013.01); *G02B 6/2553* (2013.01)

(58) Field of Classification Search
CPC .. G02B 6/2551; G02B 6/2558; G02B 6/2553; G02B 6/4454
USPC ......... 385/58–60, 65, 66, 72, 78, 96, 99, 135, 385/136
See application file for complete search history.

(56) References Cited

U.S. PATENT DOCUMENTS

| | | | |
|---|---|---|---|
| 4,598,974 A | 7/1986 | Munn et al. | |
| 5,222,171 A | 6/1993 | Strauss | |
| 5,226,101 A | 7/1993 | Szentesi et al. | |
| 5,249,247 A | 9/1993 | Whitesmith | |
| 5,748,819 A | 5/1998 | Szentesi et al. | |
| 5,772,720 A | 6/1998 | Taira-Griffin et al. | |
| 5,963,692 A * | 10/1999 | Marazzi et al. | 385/80 |
| 6,822,190 B2 | 11/2004 | Smithson et al. | |
| 7,342,198 B2 | 3/2008 | Wiley | |
| 7,594,764 B2 | 9/2009 | Palmer et al. | |
| 7,680,384 B2 | 3/2010 | Billman et al. | |
| 8,043,013 B2 | 10/2011 | Lichoulas et al. | |
| 8,118,494 B2 | 2/2012 | Larson et al. | |

(Continued)

OTHER PUBLICATIONS

PCT International Search Report and Written Opinion dated Jun. 29, 2012 for PCT International Application No. PCT International Application No. PCT?US2012/026607.

(Continued)

*Primary Examiner* — Kaveh Kianni
*Assistant Examiner* — Hung Lam
(74) *Attorney, Agent, or Firm* — McCarter & English, LLP

(57) ABSTRACT

The present disclosure provides for improved field termination optical fiber connector members and/or splicers for use in terminating or fusing optical fibers. More particularly, the present disclosure provides for convenient, low-cost, accurate, and effective methods for terminating or fusing optical fibers utilizing advantageous field termination optical fiber connector members and/or splicers. Improved apparatus and methods are provided for use in terminating or fusing a broad variety of optical fibers.

13 Claims, 22 Drawing Sheets

(56) References Cited

U.S. PATENT DOCUMENTS

| | | |
|---|---|---|
| 8,132,971 B2 | 3/2012 | Luther et al. |
| 8,376,631 B2 | 2/2013 | Milette et al. |
| 8,408,811 B2 | 4/2013 | de Jong et al. |
| 2007/0104445 A1* | 5/2007 | Larson et al. ............ 385/134 |
| 2007/0172179 A1* | 7/2007 | Billman et al. ............ 385/99 |
| 2009/0022457 A1* | 1/2009 | de Jong et al. ............ 385/96 |

OTHER PUBLICATIONS

Canadian Office Action dated May 7, 2014 for corresponding Canadian Patent Application No. 2,828,265.

Response to Canadian Office Action dated Aug. 1, 2014 for corresponding Canadian Patent Application No. 2,828,265.

* cited by examiner

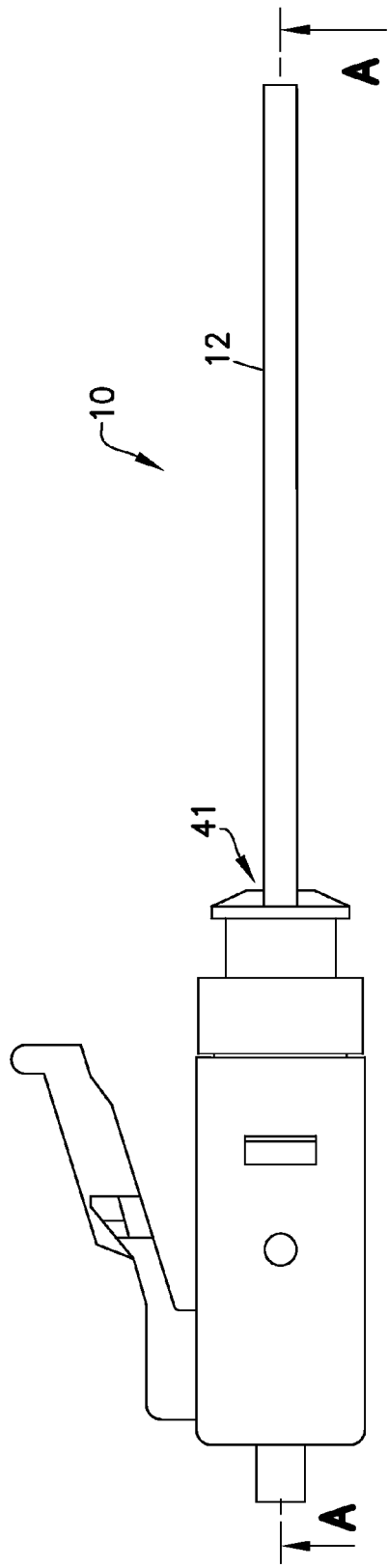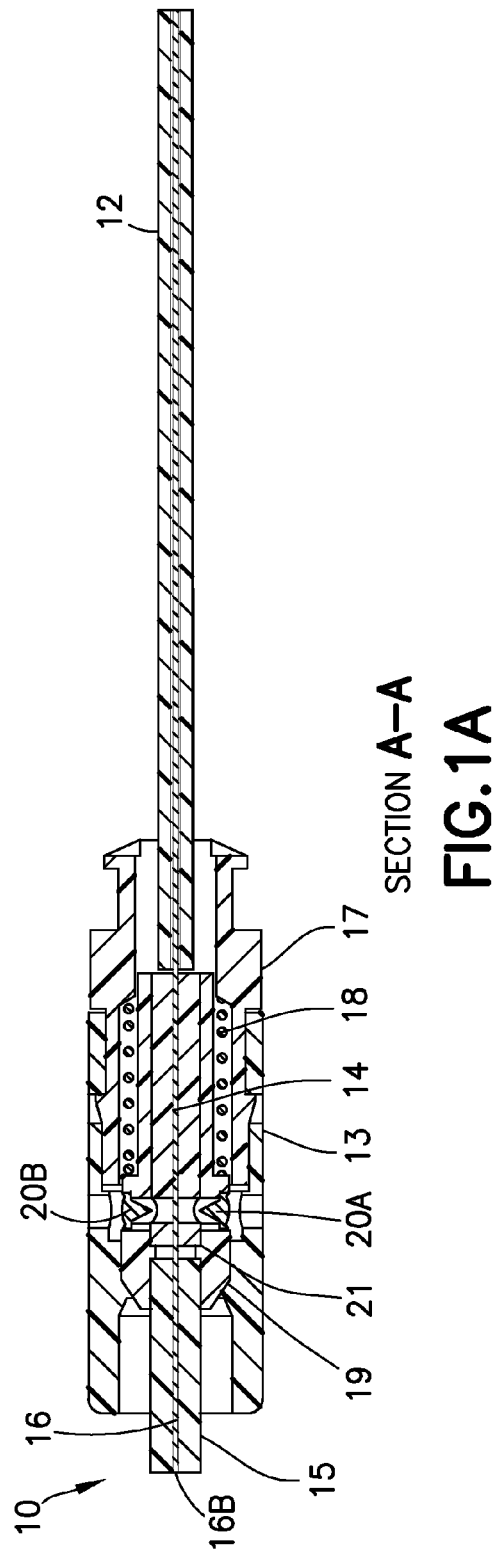
FIG.1
SECTION A-A
FIG.1A

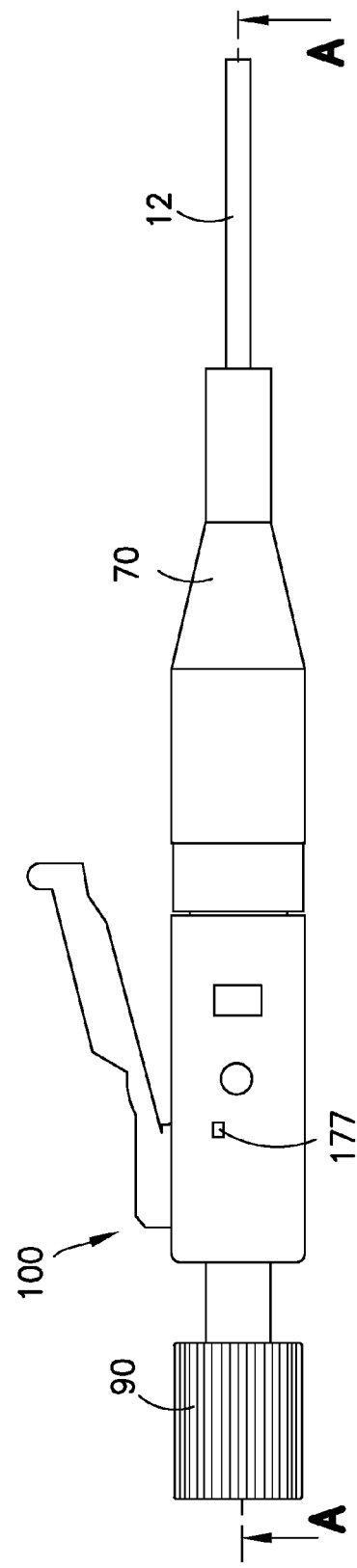
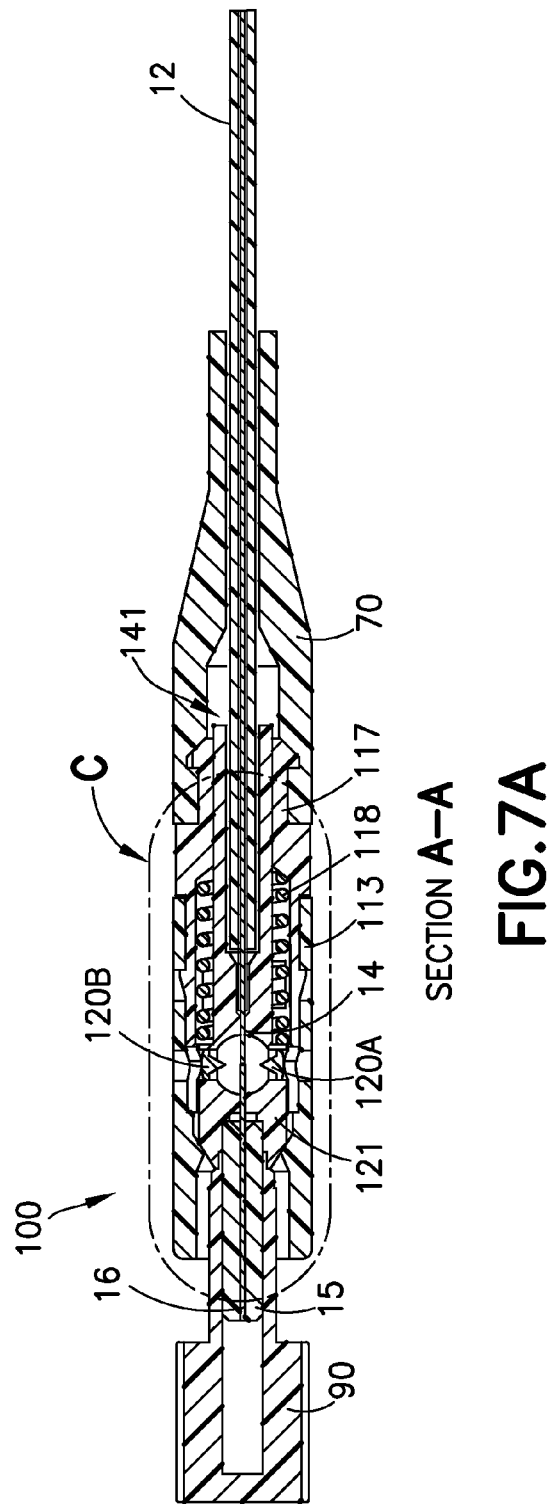
FIG.7
FIG.7A SECTION A-A

SECTION B-B

DETAIL C
SCALE 8:1

DETAIL D
SCALE 8:1

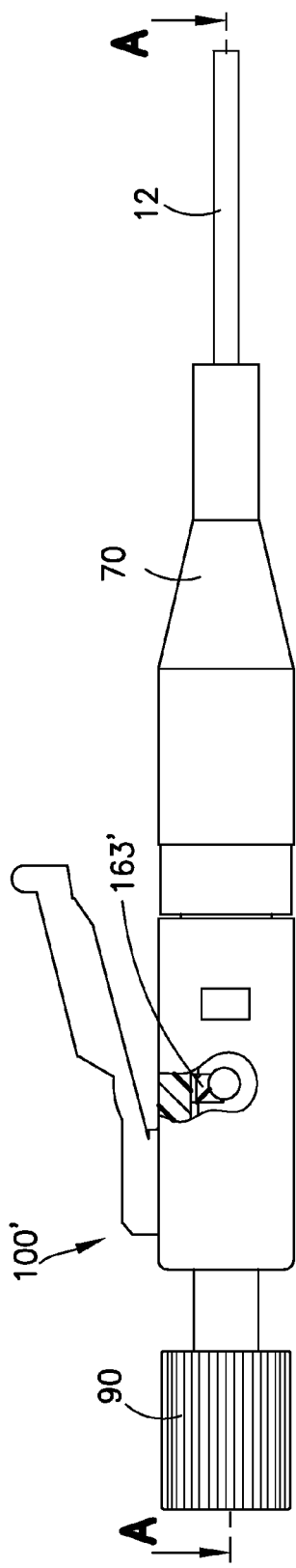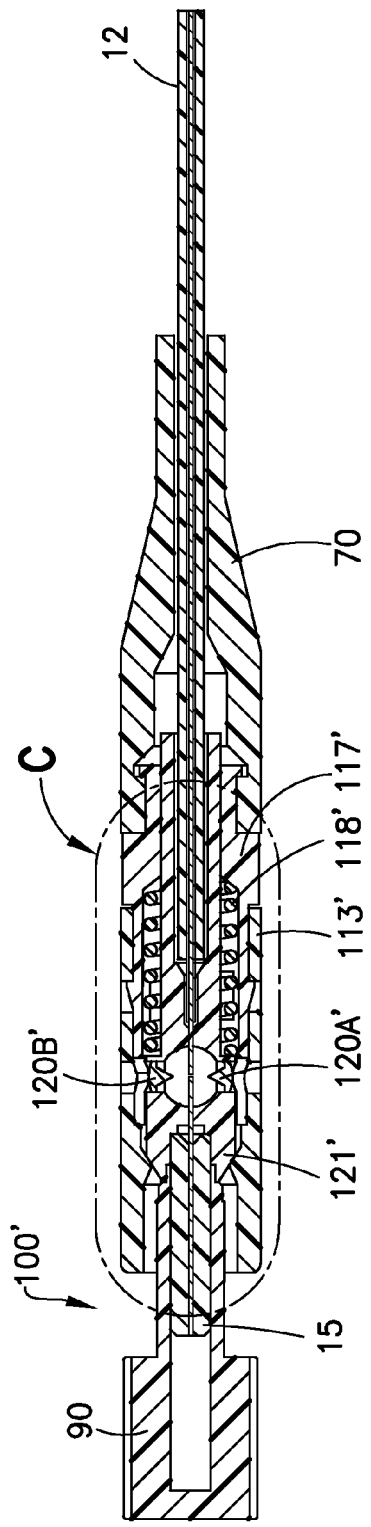
FIG.11
FIG.11A SECTION A-A

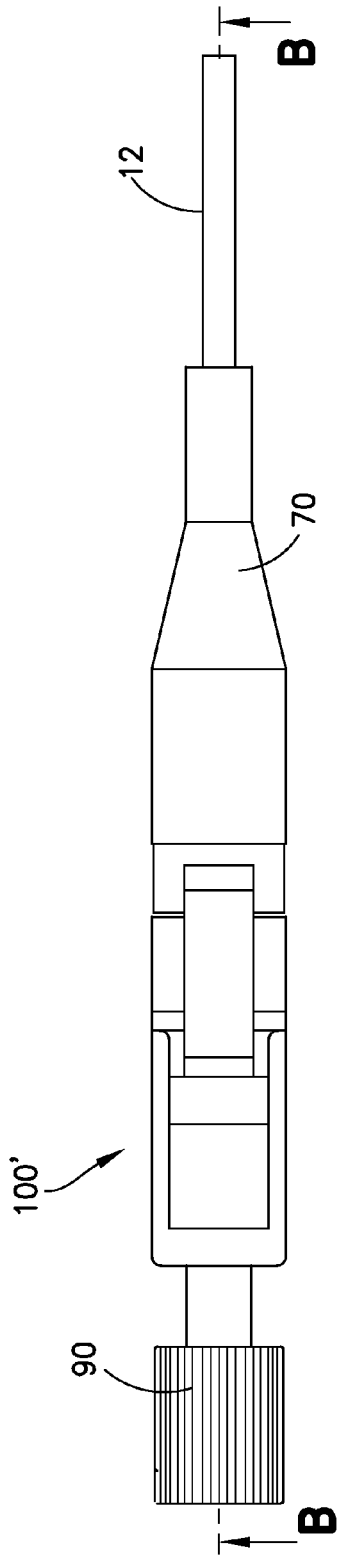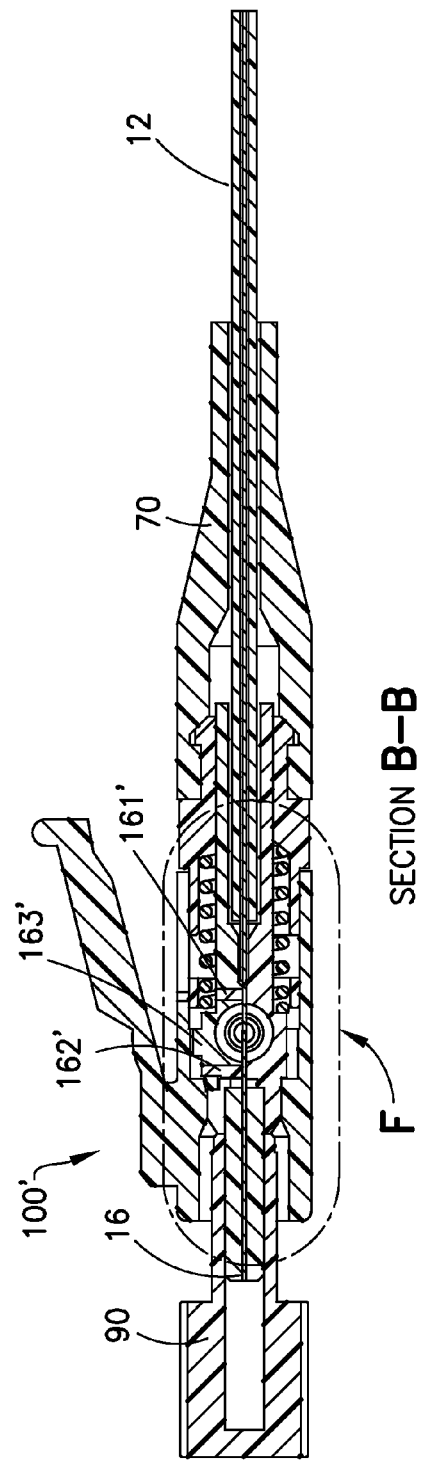

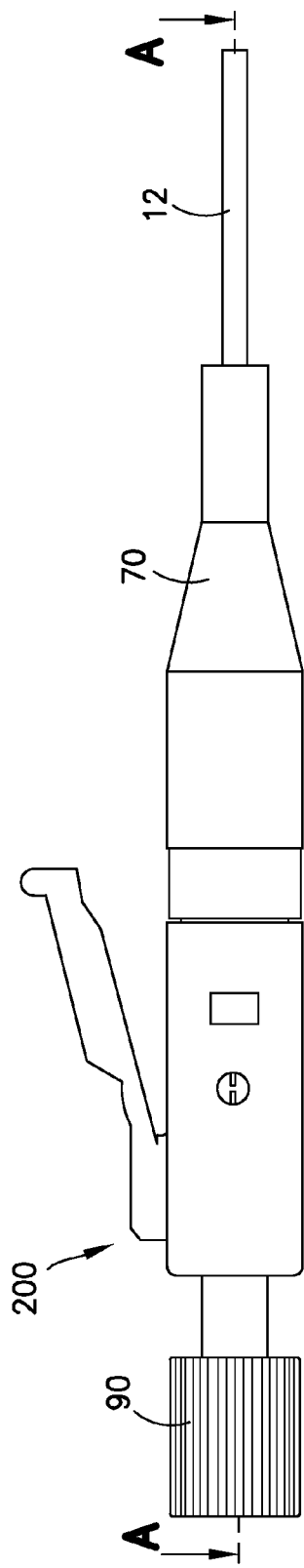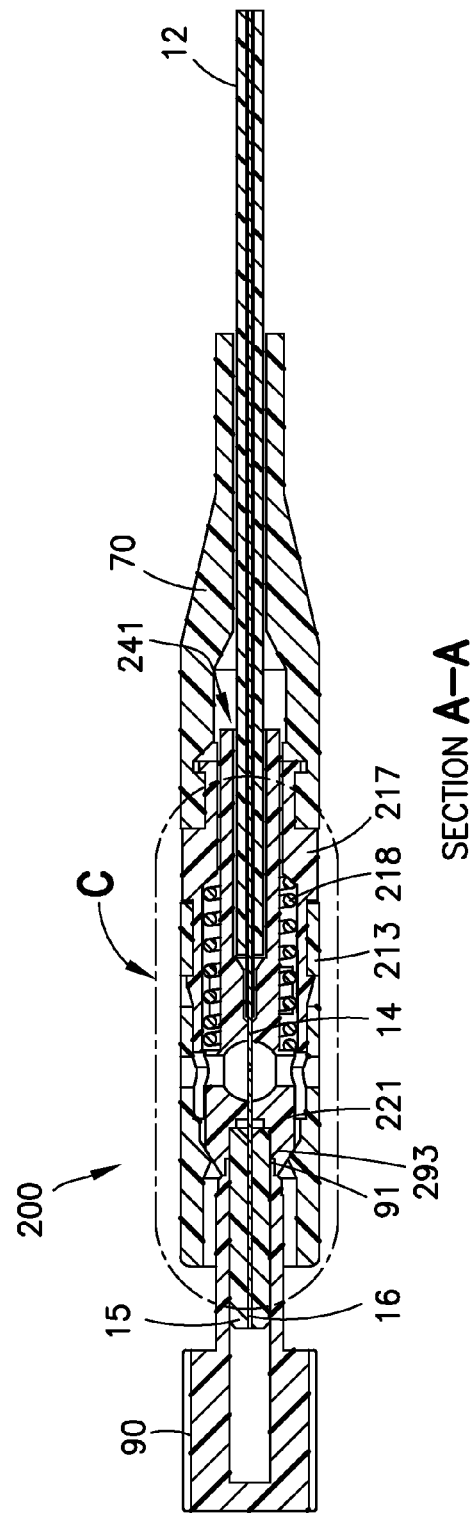
FIG.15
FIG.15A SECTION A-A

SECTION B-B

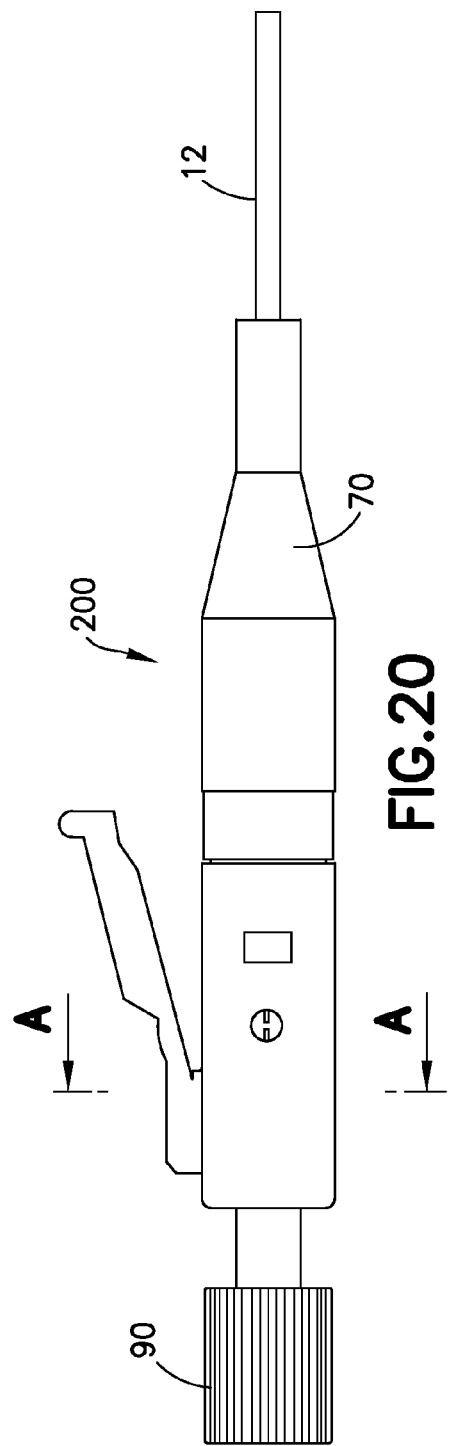
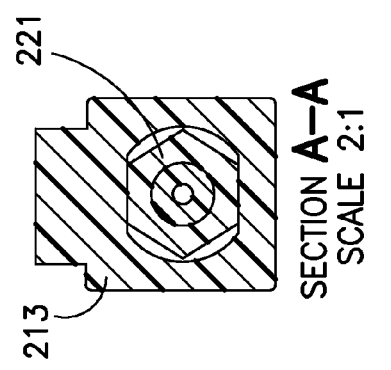

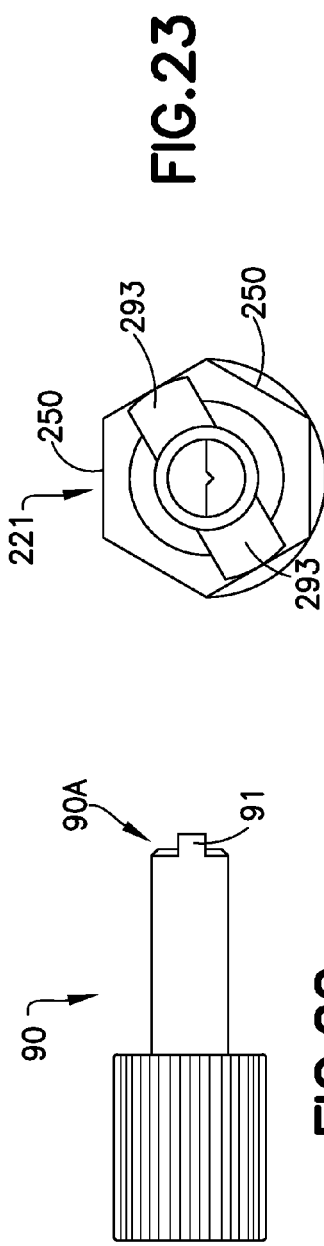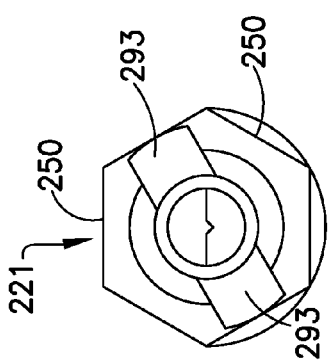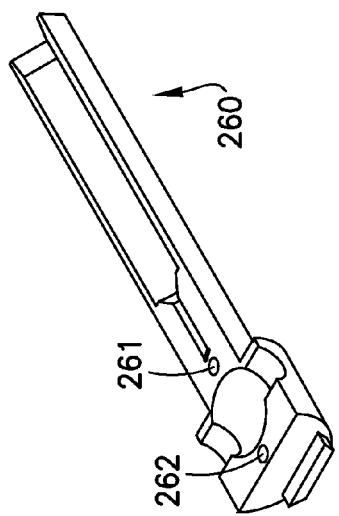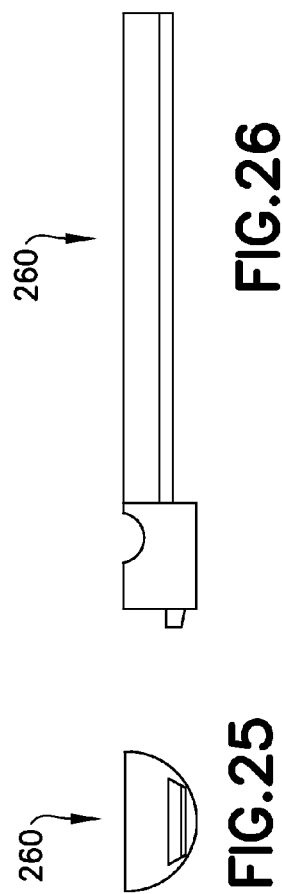

FUSION SPLICE DEVICE

CROSS-REFERENCE TO RELATED APPLICATIONS

The present application is a divisional patent application that claims priority benefit to (i) commonly assigned, co-pending U.S. Non-Provisional patent application Ser. No. 13/404,927, filed Feb. 24, 2012, and (ii) commonly assigned U.S. Provisional Patent Application Ser. No. 61/446,555, filed Feb. 25, 2011. The contents of the foregoing non-provisional and provisional applications are herein incorporated by reference in their entireties.

BACKGROUND

1. Technical Field

The present disclosure generally relates to optical fibers, optical fiber connector members and/or splicers (e.g., fusion splicers), and related assemblies. More particularly, the present disclosure relates to field termination optical fiber connector members and/or splicers for use in terminating or fusing optical fibers.

2. Background Art

In general, many of the known processes for terminating or fusing optical fibers in the field are difficult to perform. For example, some processes are described and disclosed in U.S. Pat. Nos. 4,598,974 and 8,043,013, the entire contents of each being hereby incorporated by reference in their entireties. For example, processes used to insert the fiber into a connector body and ferrule, secure the fiber with respect to the connector, and, if applicable, polish the fiber end face, can be very time consuming and/or require a great deal of skill (e.g., to reduce insertion loss performance). In addition, a great deal of skill and/or patience can be required to gain the proper fiber end face.

Moreover, current practice provides that the size and/or cost of fusion splicers or the like is typically very large, as many fusion splicers typically rely on high precision servo-motors and/or integrated vision systems to align the fiber end to end, concentrically and butted axially.

Known methods for assembling fiber optic connectors having integral electrodes for use in fusion splicing are described in, for example, U.S. Pat. No. 4,598,974 (the "'974 patent"). As disclosed in the '974 patent, an optical fiber connector may include a ferrule with an interior splice chamber. A fiber stub may then be installed in the ferrule in a factory operation with one end in the splice chamber. The ferrule also includes permanent, opposed electrodes with tips at the walls of the splice chamber. To attach the connector to an optical cable in a field operation, a predetermined length of insulation is typically stripped from the cable and the bare fiber inserted into the splice chamber through a bore in the ferrule. In general, voltage is applied across the electrodes to create a plasma arc in the splice chamber. The plasma arc melts and fuses the adjacent ends of the cable fiber and fiber stub. However, the position of the permanently mounted pair of electrodes of such connectors disclosed in the '974 patent substantially increases both the material cost and complexity of the connectors.

In accordance with some methods involving the use of a fiber stub and the use of fusion splicing and/or mechanical splicing, the bare fiber associated with the optical cable is typically secured within the associated connector body or within the strain-relief boot by means of a shrink sleeve, a v-groove/anvil, or adhesive. In general, the addition of a heat shrink sleeve elongates the connector, as well as increases the assembly time. Moreover, the use of adhesives or the like may also increase the assembly time.

Other methods for assembling fiber optic connectors without use of a fiber stub include hand-polishing the bare fiber associated with the optical cable, or using a polishing machine (e.g., in the field), and using a further method, such as one of the above-mentioned methods (e.g., shrink sleeve, v-groove/anvil, adhesive, etc.) to secure the bare fiber within the associated connector body. Additionally, other methods involve the use of an expanded beam lens.

Thus, despite efforts to date, a need remains for improved, convenient, low-cost, accurate, and effective systems and methods for terminating or fusing optical fibers (e.g., in the field) with advantageous optical fiber connector members and/or splicers, and related assemblies. These and other inefficiencies and opportunities for improvement are addressed and/or overcome by the systems and methods of the present disclosure.

SUMMARY

The present disclosure provides for improved optical fiber connector members and/or splicers (e.g., fusion splicers) for use in terminating or fusing optical fibers or the like. More particularly, the present disclosure provides for improved, convenient, low-cost, accurate, and effective systems and methods for terminating or fusing optical fibers utilizing advantageous field termination optical fiber connector members and/or splicers. Improved apparatus and methods are provided for use in terminating or fusing a broad variety of optical fibers.

In exemplary embodiments, the fiber is fusion spliced inside the connector member body to a fiber stub (e.g., to a fiber stub having an end that is pre-polished), with the alignment features and/or electrodes being integral to the fiber connector member, but with the alignment features and/or electrodes not being integrated and/or integral with the ferrule. In certain advantageous embodiments, such configuration substantially eliminates the need for extensive video alignment and/or mechanical stages in the splicer, and/or substantially eliminates the need for a fiber securing device inside the connector member, as the splice secures the fiber axially, and the alignment channel or block substantially prevents any bending of the fiber from occurring at or near the splice region. Exemplary systems and methods of the present disclosure provide several advantages, including, for example, substantially no hand polishing, very quick termination/fusion time (e.g., about 30 seconds or less), substantially no to little skill required, and lower insertion loss performance compared to conventional (e.g., pre-polished or adhesive-based) connectors.

The present disclosure provides for an optical fiber connector assembly including a connector member having a housing and a fiber retainer member housed within at least a portion of the housing, the fiber retainer member defining: (i) at least a portion of a splice chamber, and (ii) at least a portion of at least first and second lumens that extend proximal to the splice chamber; a ferrule at least partially disposed within the housing, the ferrule having a fiber stub that extends from a first end to a second end, at least a portion of the fiber stub positioned within the second lumen with the second end of the fiber stub proximal to the splice chamber; an optical fiber including a bare fiber portion that terminates at an end portion, at least a portion of the bare fiber portion positioned within the first lumen with the end portion of the optical fiber proximal to: (i) the splice chamber and, (ii) the second end of the fiber stub; wherein when first and second electrodes are positioned proximal to the splice chamber and electrical energy is applied across the first and second electrodes, the end portion of the optical fiber and the second end of the fiber stub heat and fuse together.

The present disclosure also provides for an optical fiber connector assembly wherein the first and second electrodes are integral with the fiber retainer member and define at least a portion of the splice chamber. The present disclosure also provides for an optical fiber connector assembly further comprising a ferrule retainer member housed within the housing, the ferrule retainer member: (i) housing at least a portion of the ferrule and the fiber retainer member, and (ii) defining at least a portion of the splice chamber.

The present disclosure provides for an optical fiber connector assembly wherein the housing defines a first channel and a second channel; wherein the first channel is configured to allow at least a portion of a first electrical contact to be inserted within at least a portion of the first channel and positioned proximal to the first electrode; wherein the second channel is configured to allow at least a portion of a second electrical contact to be inserted within at least a portion of the second channel and positioned proximal to the second electrode; and wherein when the first electrical contact is positioned proximal to the first electrode and the second electrical contact is positioned proximal to the second electrode, electrical energy applied to the first and second electrical contacts causes electrical energy to be applied across the first and second electrodes, thereby heating and fusing the end portion of the optical fiber and the second end of the fiber stub together.

The present disclosure also provides for an optical fiber connector assembly wherein the first and second electrical contacts are spring-loaded electrical contacts that are mounted with respect to a fusion splice device. The present disclosure also provides for an optical fiber connector assembly wherein the fusion splice device includes: (i) a first body member mounted with respect to a first cover member, the first body member configured to support at least a portion of the optical fiber with respect to the connector member, (ii) a second body member mounted with respect to a second cover member, the second body member configured to house the connector member with respect to the optical fiber, and (iii) an actuator member mounted with respect to one of the first and second body members, the actuator member configured to adjust the position of the first body member relative to the second body member, thereby allowing a user to position at least a portion of the bare fiber portion within the first lumen with the end portion of the optical fiber proximal to: (a) the splice chamber, and (b) the second end of the fiber stub.

The present disclosure also provides for an optical fiber connector assembly further including a connector adapter member configured to receive and support the connector member relative to the second body member, the connector adapter member being selectively removable and replaceable with a differently-configured instance of the connector adapter member for receiving and supporting a differently-configured instance of the connector member.

The present disclosure also provides for an optical fiber connector assembly further including a visual fault locator mounted with respect to the second body member and a photo-detector mounted with respect to the visual fault locator, the photo-detector configured to detect light from the visual fault locator in the splice chamber to facilitate the proper positioning of the end portion of the optical fiber proximal to the second end of the fiber stub. The present disclosure also provides for an optical fiber connector assembly further including an adjustment member mounted with respect to one of the first and second body members, the adjustment member configured to adjust the position of the first body member relative to the second body member; wherein at least one of the adjustment member and the actuator member is associated with at least one shaft member, the at least one shaft member mounted with respect to the first and second body members; and wherein: (i) at least one of the adjustment member and the actuator member, and (ii) the at least one shaft member, are configured to interoperate with the first and second body members to adjust the position of the first body member relative to the second body member.

The present disclosure also provides for an optical fiber connector assembly wherein the first electrical contact is mounted with respect to the second cover member and the second electrical contact is mounted with respect to the second body member. The present disclosure also provides for an optical fiber connector assembly wherein after at least a portion of the bare fiber portion is positioned within the first lumen with the end portion of the optical fiber proximal to: (i) the splice chamber, and (ii) the second end of the fiber stub, and before electrical energy is applied across the first and second electrodes to heat and fuse the end portion of the optical fiber and the second end of the fiber stub together, a switch mounted with respect to the fusion splice device is configured and adapted to be activated by a user to retract the first body member away from the second body member a pre-defined distance via the actuator member to allow a pre-fusion electrical arc to then be applied to the first and second electrodes to clean the end portion of the optical fiber and the second end of the fiber stub.

The present disclosure also provides for an optical fiber connector assembly wherein after the pre-fusion electrical arc was applied to the first and second electrodes and after a pre-determined delay, the fusion splice device is configured and adapted to: (i) begin applying electrical energy across the first and second electrodes for a pre-determined amount of time to cause the end portion of the optical fiber and the second end of the fiber stub to begin to heat and fuse together, and (ii) advance the first body member via the actuator member toward the second body member at a pre-determined rate and for a pre-determined distance as electrical energy is applied across the first and second electrodes to heat and fuse the end portion of the optical fiber and the second end of the fiber stub together.

The present disclosure also provides for an optical fiber connector assembly wherein the housing and the fiber retainer member each include portions that define a first channel and a second channel; wherein the first channel is configured to allow at least a portion of the first electrode to be inserted within at least a portion of the first channel and positioned proximal to the splice chamber; wherein the second channel is configured to allow at least a portion of the second electrode to be inserted within at least a portion of the second channel and positioned proximal to the splice chamber; and wherein the first and second electrodes are mounted with respect to a fusion splice device.

The present disclosure also provides for an optical fiber connector assembly wherein the fusion splice device includes: (i) a first body member mounted with respect to a first cover member, the first body member configured to support at least a portion of the optical fiber with respect to the connector member, (ii) a second body member mounted with respect to a second cover member, the second body member configured to house the connector member with respect to the optical fiber, and (iii) an actuator member mounted with respect to one of the first and second body members, the actuator member configured to adjust the position of the first body member relative to the second body member, thereby allowing a user to position at least a portion of the bare fiber portion within the first lumen with the end portion of the optical fiber proximal to: (a) the splice chamber, and (b) the second end of the fiber stub.

The present disclosure also provides for an optical fiber connector assembly further including a connector adapter member configured to receive and support the connector member relative to the second body member, the connector adapter member being selectively removable and replaceable with a differently-configured instance of the connector adapter member for receiving and supporting a differently-configured instance of the connector member.

The present disclosure also provides for an optical fiber connector assembly further including a visual fault locator mounted with respect to the second body member and a photo-detector mounted with respect to at least one of the visual fault locator and the second body member, the photo-detector configured to detect light from the visual fault locator in the splice chamber to facilitate the proper positioning of the end portion of the optical fiber proximal to the second end of the fiber stub.

The present disclosure also provides for an optical fiber connector assembly further including an adjustment member mounted with respect to one of the first and second body members, the adjustment member configured to adjust the position of the first body member relative to the second body member; wherein at least one of the adjustment member and the actuator member is associated with at least one shaft member, the at least one shaft member mounted with respect to the first and second body members; and wherein: (i) at least one of the adjustment member and the actuator member, and (ii) the at least one shaft member, are configured to interoperate with the first and second body members to adjust the position of the first body member relative to the second body member.

The present disclosure also provides for an optical fiber connector assembly wherein the first electrode is mounted with respect to the second cover member and the second electrode is mounted with respect to the second body member. The present disclosure also provides for an optical fiber connector assembly wherein after at least a portion of the bare fiber portion is positioned within the first lumen with the end portion of the optical fiber proximal to: (i) the splice chamber, and (ii) the second end of the fiber stub, and before electrical energy is applied across the first and second electrodes to heat and fuse the end portion of the optical fiber and the second end of the fiber stub together, a switch mounted with respect to the fusion splice device is configured and adapted to be activated by a user to retract the first body member away from the second body member a pre-defined distance via the actuator member to allow a pre-fusion electrical arc to then be applied to the first and second electrodes to clean the end portion of the optical fiber and the second end of the fiber stub.

The present disclosure also provides for an optical fiber connector assembly wherein after the pre-fusion electrical arc was applied to the first and second electrodes and after a pre-determined delay, the fusion splice device is configured and adapted to: (i) begin applying electrical energy across the first and second electrodes for a pre-determined amount of time to cause the end portion of the optical fiber and the second end of the fiber stub to begin to heat and fuse together, and (ii) advance the first body member via the actuator member toward the second body member at a pre-determined rate and for a pre-determined distance as electrical energy is applied across the first and second electrodes to heat and fuse the end portion of the optical fiber and the second end of the fiber stub together.

The present disclosure also provides for an optical fiber connector assembly further including an anvil member housed within at least a portion of the housing, the anvil member defining at least a portion of the splice chamber; wherein the anvil member includes first and second compression members, the first and second compression members configured to allow: (i) the first compression member to engage and position at least a portion of the bare fiber portion of the optical fiber within the first lumen, and (ii) the second compression member to engage and position at least a portion of the fiber stub within the second lumen.

The present disclosure also provides for an optical fiber connector assembly wherein the housing includes a receiving opening configured to receive an insert member; and wherein prior to positioning at least a portion of the bare fiber portion within the first lumen with the end portion of the optical fiber proximal to: (i) the splice chamber, and (ii) the second end of the fiber stub, the insert member is configured to be positioned within the receiving opening of the housing to engage the anvil member and move the anvil member to create a gap that opens up at least a portion of the first lumen so that at least a portion of the bare fiber portion may be positioned within the first lumen.

The present disclosure also provides for an optical fiber connector assembly wherein the connector member further includes a resilient member positioned at least partially around the fiber retainer member and the anvil member; and wherein after: (i) at least a portion of the bare fiber portion is positioned within the first lumen, and (ii) the insert member is removed from the receiving opening, the resilient member causes: (a) the first compression member to engage and position at least a portion of the bare fiber portion of the optical fiber within the first lumen, and (b) the second compression member to engage and position at least a portion of the fiber stub within the second lumen.

The present disclosure also provides for an optical fiber connector assembly further including an anvil member housed within at least a portion of the housing, the anvil member defining at least a portion of the splice chamber; wherein the anvil member includes first and second compression members, the first and second compression members configured to allow: (i) the first compression member to engage and position at least a portion of the bare fiber portion of the optical fiber within the first lumen, and (ii) the second compression member to engage and position at least a portion of the fiber stub within the second lumen; wherein the anvil member further includes an engagement protuberance; and wherein prior to positioning at least a portion of the bare fiber portion within the first lumen with the end portion of the optical fiber proximal to: (i) the splice chamber, and (ii) the second end of the fiber stub, a user would position the first and second electrical contacts within the first and second channels to engage the engagement protuberance and move the anvil member to create a gap that opens up at least a portion of the first lumen so that at least a portion of the bare fiber portion may be positioned within the first lumen.

The present disclosure also provides for an optical fiber connector assembly wherein the connector member further includes a resilient member positioned at least partially around the fiber retainer member and the anvil member; and wherein after: (i) at least a portion of the bare fiber portion is positioned within the first lumen, and (ii) the first and second electrical contacts are removed from the first and second channels, the resilient member causes: (a) the first compression member to engage and position at least a portion of the bare fiber portion of the optical fiber within the first lumen, and (b) the second compression member to engage and position at least a portion of the fiber stub within the second lumen.

The present disclosure also provides for an optical fiber connector assembly further including an anvil member housed within at least a portion of the housing, the anvil member defining at least a portion of the splice chamber; wherein the anvil member includes first and second compression members, the first and second compression members configured to allow: (i) the first compression member to engage and position at least a portion of the bare fiber portion of the optical fiber within the first lumen, and (ii) the second compression member to engage and position at least a portion of the fiber stub within the second lumen; wherein prior to positioning at least a portion of the bare fiber portion within the first lumen with the end portion of the optical fiber proximal to: (i) the splice chamber, and (ii) the second end of the fiber stub, a user would position the first and second electrodes within the first and second channels to engage the anvil member and move the anvil member to create a gap that opens up at least a portion of the first lumen so that at least a portion of the bare fiber portion may be positioned within the first lumen.

The present disclosure also provides for an optical fiber connector assembly wherein the connector member further includes a resilient member positioned at least partially around the fiber retainer member and the anvil member; and wherein after: (i) at least a portion of the bare fiber portion is positioned within the first lumen, and (ii) the first and second electrodes are removed from the first and second channels, the resilient member causes: (a) the first compression member to engage and position at least a portion of the bare fiber portion of the optical fiber within the first lumen, and (b) the second compression member to engage and position at least a portion of the fiber stub within the second lumen.

The present disclosure also provides for an optical fiber connector assembly wherein a cap member is mounted with respect to the connector member, the cap member configured to allow a user to rotate the retainer member so that the portions of the retainer member that define the first and second channels are not aligned with the portions of the housing that define the first and second channels to thereby close off the splice chamber. The present disclosure also provides for an optical fiber connector assembly wherein the cap member includes at least one extending member that is configured to engage with at least one notch positioned along the retainer member, the engagement of which allows a user to rotate the retainer member axially.

The present disclosure also provides for an optical fiber connector assembly including a connector member having a housing and a fiber retainer member housed within at least a portion of the housing, the fiber retainer member defining: (i) at least a portion of a splice chamber, and (ii) at least a portion of at least first and second lumens that extend proximal to the splice chamber; a ferrule at least partially disposed within the housing, the ferrule having a fiber stub that extends from a first end to a second end, at least a portion of the fiber stub positioned within the second lumen with the second end of the fiber stub proximal to the splice chamber; an optical fiber including a bare fiber portion that terminates at an end portion, at least a portion of the bare fiber portion positioned within the first lumen with the end portion of the optical fiber proximal to: (i) the splice chamber and, (ii) the second end of the fiber stub; an anvil member housed within at least a portion of the housing, the anvil member defining at least a portion of the splice chamber, the anvil member including first and second compression members, the first and second compression members configured to allow: (i) the first compression member to engage and position at least a portion of the bare fiber portion of the optical fiber within the first lumen, and (ii) the second compression member to engage and position at least a portion of the fiber stub within the second lumen; wherein the housing and the fiber retainer member each include portions that define a first channel and a second channel; wherein the first channel is configured to allow at least a portion of a first electrode to be inserted within at least a portion of the first channel and positioned proximal to the splice chamber, and the second channel is configured to allow at least a portion of a second electrode to be inserted within at least a portion of the second channel and positioned proximal to the splice chamber; and wherein when first and second electrodes are positioned proximal to the splice chamber and electrical energy is applied across the first and second electrodes, the end portion of the optical fiber and the second end of the fiber stub heat and fuse together; wherein prior to positioning at least a portion of the bare fiber portion within the first lumen with the end portion of the optical fiber proximal to: (i) the splice chamber, and (ii) the second end of the fiber stub, a user would position the first and second electrodes within the first and second channels to engage the anvil member and move the anvil member to create a gap that opens up at least a portion of the first lumen so that at least a portion of the bare fiber portion may be positioned within the first lumen.

The present disclosure also provides for a method for terminating optical fibers including providing a connector member having a housing and a fiber retainer member housed within at least a portion of the housing, the fiber retainer member defining: (i) at least a portion of a splice chamber, and (ii) at least a portion of at least first and second lumens that extend proximal to the splice chamber; providing a ferrule at least partially disposed within the housing, the ferrule having a fiber stub that extends from a first end to a second end; positioning at least a portion of the fiber stub within the second lumen with the second end of the fiber stub proximal to the splice chamber; providing an optical fiber including a bare fiber portion that terminates at an end portion; positioning at least a portion of the bare fiber portion within the first lumen with the end portion of the optical fiber proximal to: (i) the splice chamber and, (ii) the second end of the fiber stub; positioning first and second electrodes proximal to the splice chamber; and applying electrical energy across the first and second electrodes to heat and fuse the end portion of the optical fiber and the second end of the fiber stub together.

Additional advantageous features, functions and applications of the disclosed assemblies, systems and methods of the present disclosure will be apparent from the description which follows, particularly when read in conjunction with the appended figures.

BRIEF DESCRIPTION OF THE DRAWINGS

Exemplary embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed assemblies, systems and methods, reference is made to the appended figures, wherein:

FIG. 1 is a side view of a fusion splice optical fiber connector member with a cleaved fiber shown ready to be spliced, in accordance with an exemplary embodiment of the present disclosure;

FIG. 1A is a cross-sectional view of the connector member of FIG. 1 taken substantially along the line A-A and details the splice chamber, internal electrodes and ferrule of the connector member, in accordance with an exemplary embodiment of the present disclosure;

FIG. 7 is a side view of another fusion splice optical fiber connector member with a cleaved fiber shown ready to be spliced, in accordance with another exemplary embodiment of the present disclosure;

FIG. 7A is a cross-sectional view of the connector member of FIG. 7 taken substantially along the line A-A, in accordance with another exemplary embodiment of the present disclosure;

FIG. 11 is a side view of another fusion splice optical fiber connector member with a cleaved fiber shown ready to be spliced, in accordance with another exemplary embodiment of the present disclosure;

FIG. 11A is a cross-sectional view of the connector member of FIG. 11 taken substantially along the line A-A, in accordance with another exemplary embodiment of the present disclosure;

FIG. 12 is a top view of the connector member of FIG. 11;

FIG. 12A is a cross-sectional view of the connector member of FIG. 12 taken substantially along the line B-B;

FIG. 15 is a side view of another fusion splice optical fiber connector member with a cleaved fiber shown ready to be spliced, in accordance with another exemplary embodiment of the present disclosure;

FIG. 15A is a cross-sectional view of the connector member of FIG. 15 taken substantially along the line A-A, in accordance with another exemplary embodiment of the present disclosure;

FIG. 20 is another side view of the connector member of FIG. 15;

FIG. 21 is a partial front cross-sectional view of the housing and fiber alignment and retainer member of the connector member of FIG. 20 taken substantially along the line A-A of FIG. 20;

FIG. 22 is a side view of an exemplary cap member for use with the connector member of FIG. 15;

FIG. 23 is a front view of an exemplary fiber alignment and retainer member for use with the connector member of FIG. 15;

FIG. 24 is a side perspective view of an exemplary anvil member for use with the connector member of FIG. 15;

FIG. 25 is a front view of the anvil member of FIG. 24;

FIG. 26 is a side view of the anvil member of FIG. 24;

DETAILED DESCRIPTION

Figure 2:
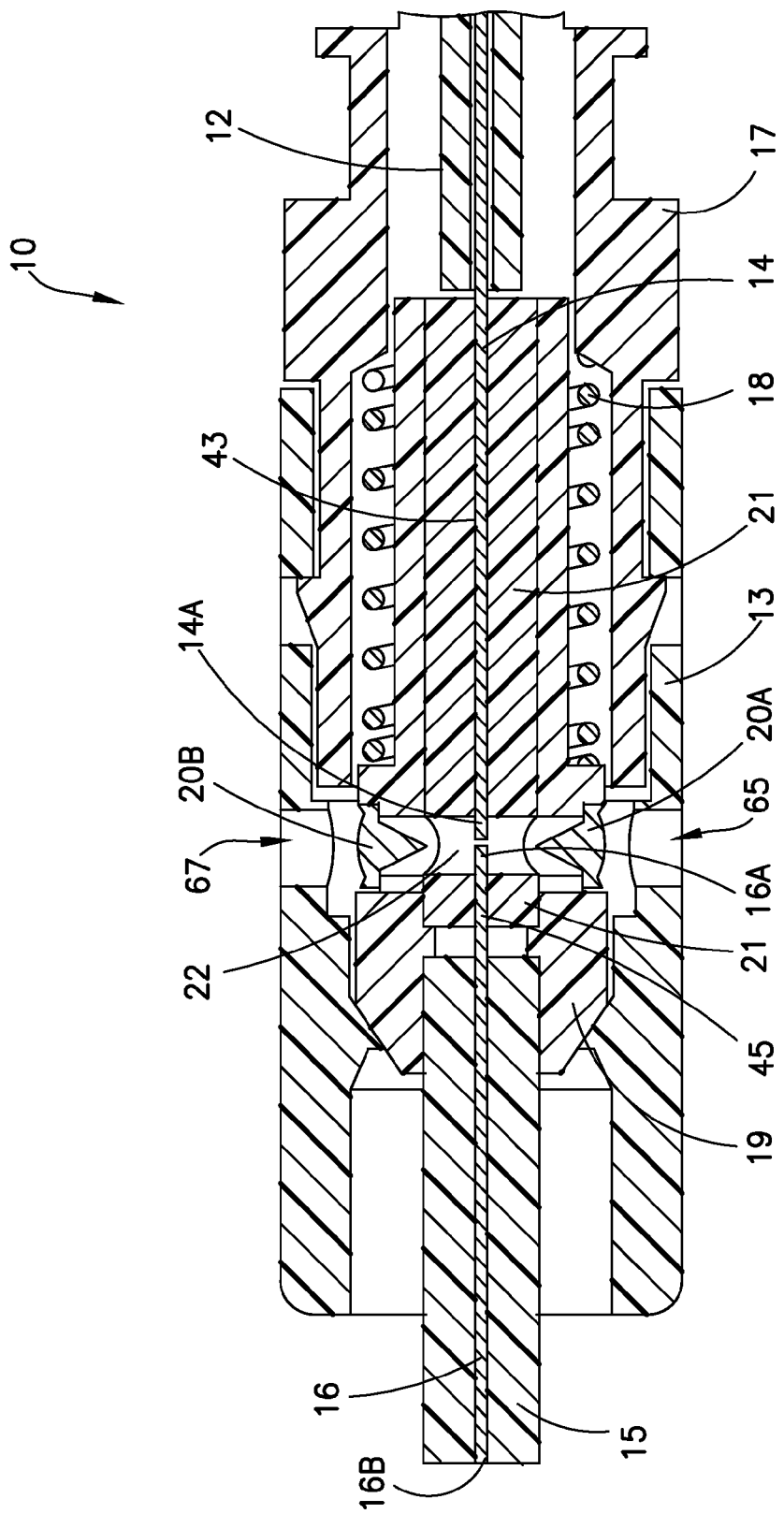
FIG. 2 is a partial exploded view of the exemplary connector member of FIG. 1A showing the fiber in the pre-fuse position.

In the description which follows, like parts are marked throughout the specification and drawings with the same reference numerals, respectively. Drawing figures are not necessarily to scale and in certain views, parts may have been exaggerated for purposes of clarity.

The present disclosure provides for improved optical fiber connector members and/or splicers (e.g., fusion splicers), and related assemblies. More particularly, the present disclosure provides for advantageous optical fiber connector members and/or splicers for use in terminating or fusing optical fibers or the like. In general, the present disclosure provides for improved, convenient, low-cost, accurate, and effective systems and methods for terminating or fusing optical fibers (e.g., in the field) with advantageous optical fiber connector members and/or splicers, and related assemblies. Improved apparatus and methods are provided for use in terminating or fusing a broad variety of optical fibers. Potential users of the systems and methods disclosed herein may include, for example, contractors, the telecommunications industry, the military, the aviation industry, the marine products industry, and/or any user who has a need to terminate optical fibers or the like.

In exemplary embodiments, the fiber is fusion spliced inside a connector member body to a fiber stub (e.g., to a fiber stub having an end that is pre-polished), with the alignment features and/or electrodes being integral to the fiber connector member, but with the alignment features and/or electrodes not being integrated with the ferrule. In exemplary embodiments, such advantageous configuration substantially eliminates the need for: (i) extensive video alignment and/or mechanical stages in the splicer, and/or (ii) a fiber securing device inside the connector member, as the splice secures the fiber axially, and the alignment channel or block substantially prevents any bending of the fiber from occurring at or near the splice region.

There are many advantageous properties and/or characteristics of the present disclosure. Some advantageous properties and/or characteristics of the present disclosure include, but are not limited to, substantially no hand polishing, very quick termination/fusion time (e.g., 30 seconds or less), substantially no to little skill required, and lower insertion loss performance compared to conventional (e.g., pre-polished or adhesive-based) connectors.

Referring now to the drawings, there is illustrated an exemplary optical fiber connector member 10 (e.g., a fusion splice optical fiber connector member) and an exemplary fusion splice device or unit 11. For example, connector member 10 may be a fiber LC stub connector member and the fusion splice device 11 may be a handheld fusion splice unit, although the present disclosure is not limited thereto. Alternatively, connector member 10 may be another type of connector member, such as, for example, a SC, ST, FC, MPO, MT-RJ, MU, DIN, E2000, Mil-38999 or FDDI connector member.

In general, connector member 10 (e.g., fiber LC stub connector member) is configured and dimensioned for use in terminating or fusing optical cables/fibers 12 or the like. As shown in FIGS. 1-5, connector member 10 and fusion splice device 11 may be used to achieve field termination of connector member 10 with respect to an optical cable 12. Optical cable 12 typically includes a bare fiber portion 14 (e.g., stripped and cleaved) that terminates at end portion 14A. In exemplary embodiments, at least a portion of bare fiber portion 14, including end portion 14A, is configured and dimensioned to be inserted into a first end 41 of connector member 10.

In general, connector member 10 includes a connector housing/body 13, a coupling attachment 17 and a spring 18. Coupling attachment 17 typically is configured and dimensioned to be mounted with respect to a strain relief boot 70 or the like (see, e.g., FIGS. 7-18).

Connector member 10 typically also includes a ferrule 15 at least partially disposed within the connector housing 13, the ferrule 15 typically having a fiber stub 16 installed and/or positioned therein. Fiber stub 16 typically extends from end portion 16A to end portion 16B. In exemplary embodiments, end portion 16B is pre-polished, and end portion 16A is cleaved (e.g., factory cleaved).

In exemplary embodiments and as shown in FIGS. 1A and 2, connector member 10 includes a ferrule adapter/retainer member 19, two electrodes 20A and 20B, and a fiber alignment and retainer member 21 housed within at least a portion of housing 13. In general, the ferrule adapter/retainer member 19, the two electrodes 20A and 20B, and the fiber alignment and retainer member 21 are configured and dimensioned to define an arc or splice chamber 22 with fiber alignment (e.g., alignment of end portions 14A and 16A). In exemplary embodiments, housing 13 defines a first electrical contact port or channel 65, and a second electrical contact port or channel 67. In general, channels 65, 67 are configured and dimensioned to allow at least of portion of electrical contacts 31A, 31B, respectively, to be inserted within at least a portion of channels 65, 67, as discussed further below. Ferrule adapter/retainer member 19 is typically configured to retain, position and/or house at least a portion of the ferrule 15 and/or member 21 at least partially disposed within the connector housing 13.

In one embodiment and as shown in FIG. 2, fiber alignment and retainer member 21 defines a first alignment lumen, channel or tube 43 inside connector housing 13 that is configured to receive and/or align at least a portion of bare fiber portion 14, and fiber alignment and retainer member 21 defines a second alignment lumen, channel or tube 45 inside connector housing 13 that is configured to receive and/or align at least a portion of fiber stub 16. In general, lumens 43 and 45 are configured and dimensioned to receive and/or align end portions 14A and 16A, respectively, in close proximity to one another and in close proximity to the pair of electrodes 20A, 20B at or near the splice chamber 22.

In exemplary embodiments, an integrated visual fault locator (VFL) 50 (FIG. 3) may be used to ensure that end portion 14A of the bare fiber portion 14 is in proper location, contact and/or position with respect to the end portion 16A of the internal fiber stub 16. In exemplary embodiments, VFL 50 is mounted with respect to second body member 24. For example, a photo-detector or the like may be mounted with respect to and/or associated with VFL 50 (e.g., via an optical splitter) and be utilized to detect the back-reflected light from VFL 50 in splice chamber 22 to facilitate the proper positioning of end portions 14A, 16A relative to one another.

In one embodiment, electrodes 20A and 20B are integrated electrodes (e.g., integrated and/or integral with respect to the fiber alignment and retainer member 21 and/or to the housing 13) that are aligned in the vicinity of the splice chamber 22. In alternative embodiments and as further discussed below, other connector members (e.g., connector member 200) without integrated electrodes 20A, 20B may be utilized with device 11, with the electrodes (e.g., electrodes 320A, 320B) utilized during the fusion process being positioned/located and/or associated with respect to fusion splice device 11.

In exemplary embodiments, fusion splice device or arc generator device 11 typically includes internal circuitry for generating a fusion splice arc or electrical arc which is transferred to the connector splice chamber 22 via electrical contacts 31A, 31B and electrodes 20A, 20B (or via electrodes 120A, 120B, as discussed further below). In one embodiment, the internal circuitry of the fusion splice device 11 sends/ applies electrical energy to electrical contacts 31A, 31B, which, in turn, send/apply electrical energy across electrodes 20A, 20B to create a fusion splice arc in the splice chamber 22, thereby causing the end portion 16A of the fiber stub 16 and the end portion 14A of the cleaved fiber end 14 to heat and fuse together.

Figure 3:
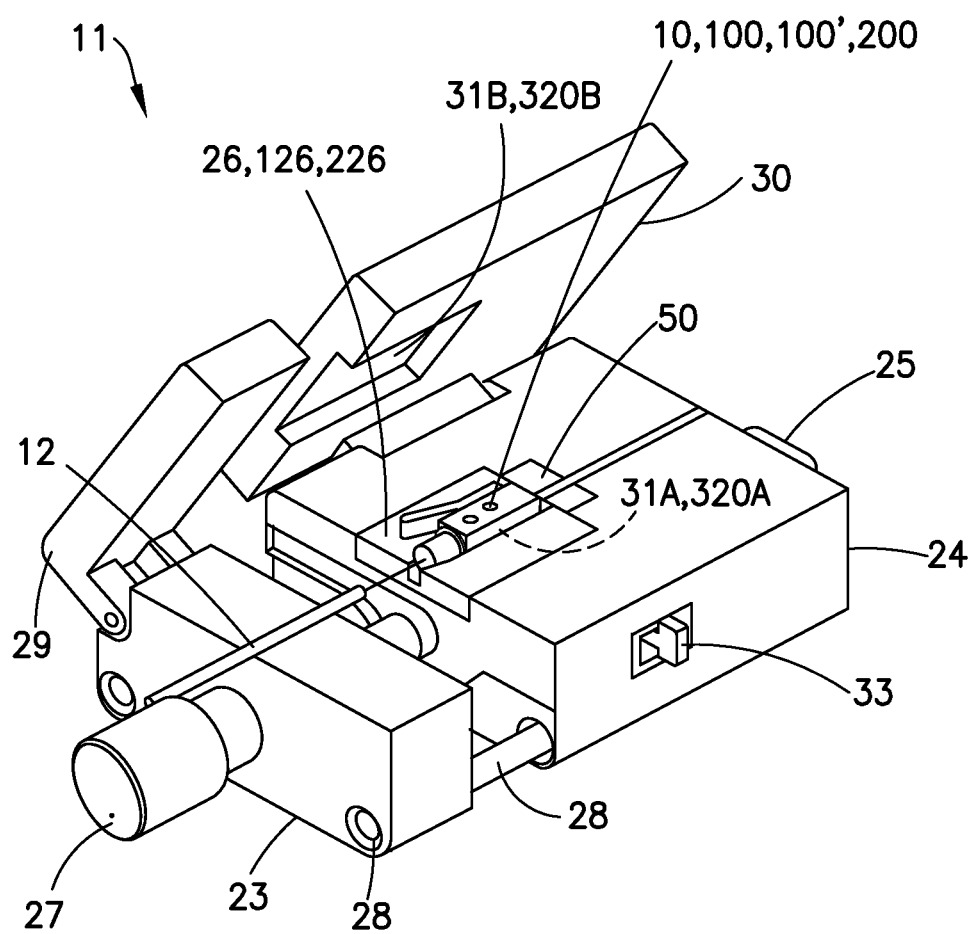
FIG. 3 is a top perspective view of an exemplary embodiment of a fusion splice device for use with exemplary connector members of the present disclosure, FIG. 3 also depicting the splice device with an exemplary connector member and cleaved fiber, the fiber being ready for insertion.
Figure 4:
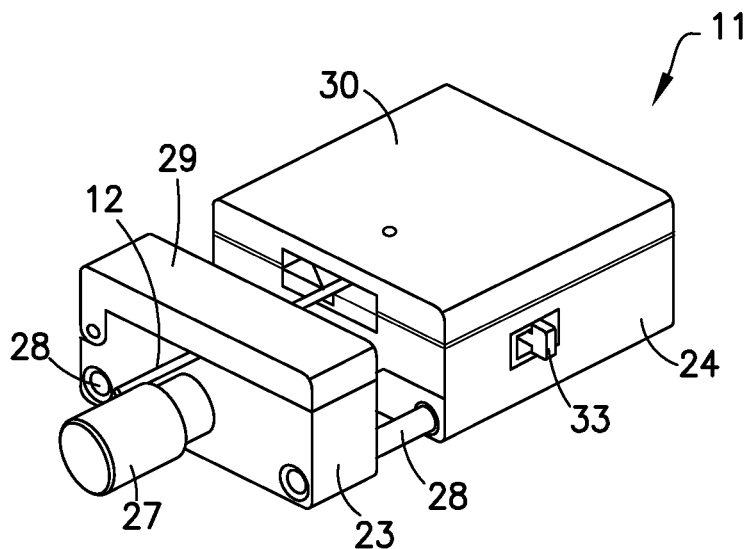
FIG. 4 is a top perspective view of the exemplary fusion splice device of FIG. 3, with the covers closed and ready for insertion of the fiber into the connector member.
Figure 5:
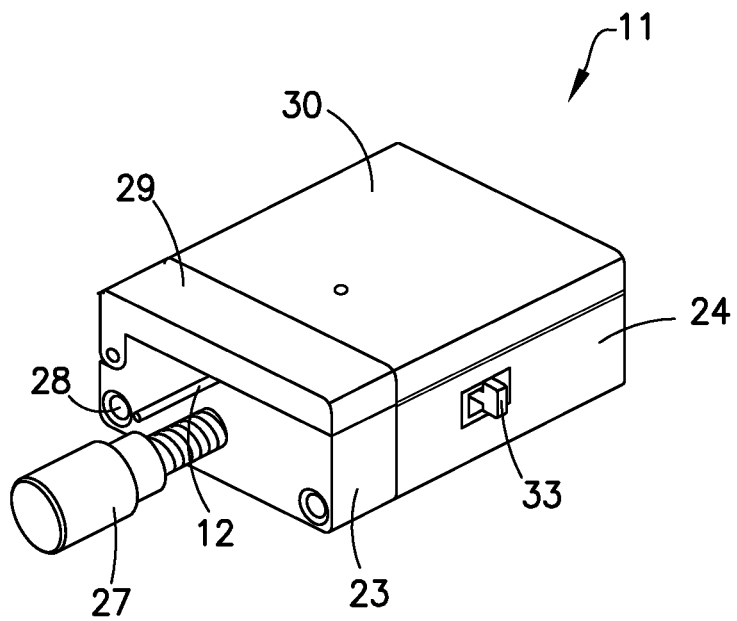
FIG. 5 is a top perspective view of the exemplary fusion splice device of FIG. 3, with the covers closed and the fiber sled retracted to insert the fiber into the connector member.

In exemplary embodiments and as shown in FIGS. 3-5, fusion splice device 11 includes a first body member 23 (e.g., a sled body) and a second body member or housing 24. First body member 23 is configured and dimensioned to support at least a portion of optical cable 12 and/or bare fiber portion 14, and second body member 24 is configured and dimensioned to support, house and/or receive connector member 10.

In exemplary embodiments, fusion splice device 11 includes an actuator member 25 (e.g., a precision linear actuator or an air piston or the like). In general, actuator member 25 is configured and adapted to slowly move/advance/retract the bare fiber portion 14 supported by the first body member 23 relative to the splice chamber 22 of connector member 10 during the fusing process, as discussed below. In one embodiment, actuator member 25 includes at least two dampener springs.

Fusion splice device 11 typically includes connector insert member/adapter 26 (e.g., an interchangeable block or adapter plate) that is sized, shaped, and configured to receive, house and/or support connector member 10 within and with respect to the second body member 24, and to position and orient the connector member 10 appropriately with respect to the optical cable 12, including with respect to the bare fiber portion 14 of optical cable 12. Connector insert member 26 may be removed and replaced with one or more of a plurality of differently-configured connector insert members or blocks (e.g., insert members 126 or 226, discussed below) to advantageously facilitate use of device 11 with respect to a wide variety of differently-configured optical fiber connector members (e.g., connector members 100 or 200, discussed below).

In exemplary embodiments, fusion splice device 11 may include an adjustment or screw member 27 (e.g., a precision adjustment thumbscrew) and a pair of shaft members or rails 28 mounted with respect to the first and second body members 23, 24, with the adjustment member 27 (and/or actuator member 25) and the shaft members 28 being sized, shaped, and configured to interoperate with the first and second body members 23, 24 to provide a means for adjusting (e.g., manually adjusting) the position of the first body member 23 relative to the second body member 24 (e.g., to a position to facilitate fusion of at least a portion of bare fiber portion 14 to fiber stub 16 associated with connector member 10). Each shaft member 28 typically is associated with at least one spring. It is noted that certain embodiments of splice device 11 do not include screw member 27.

Figure 6:
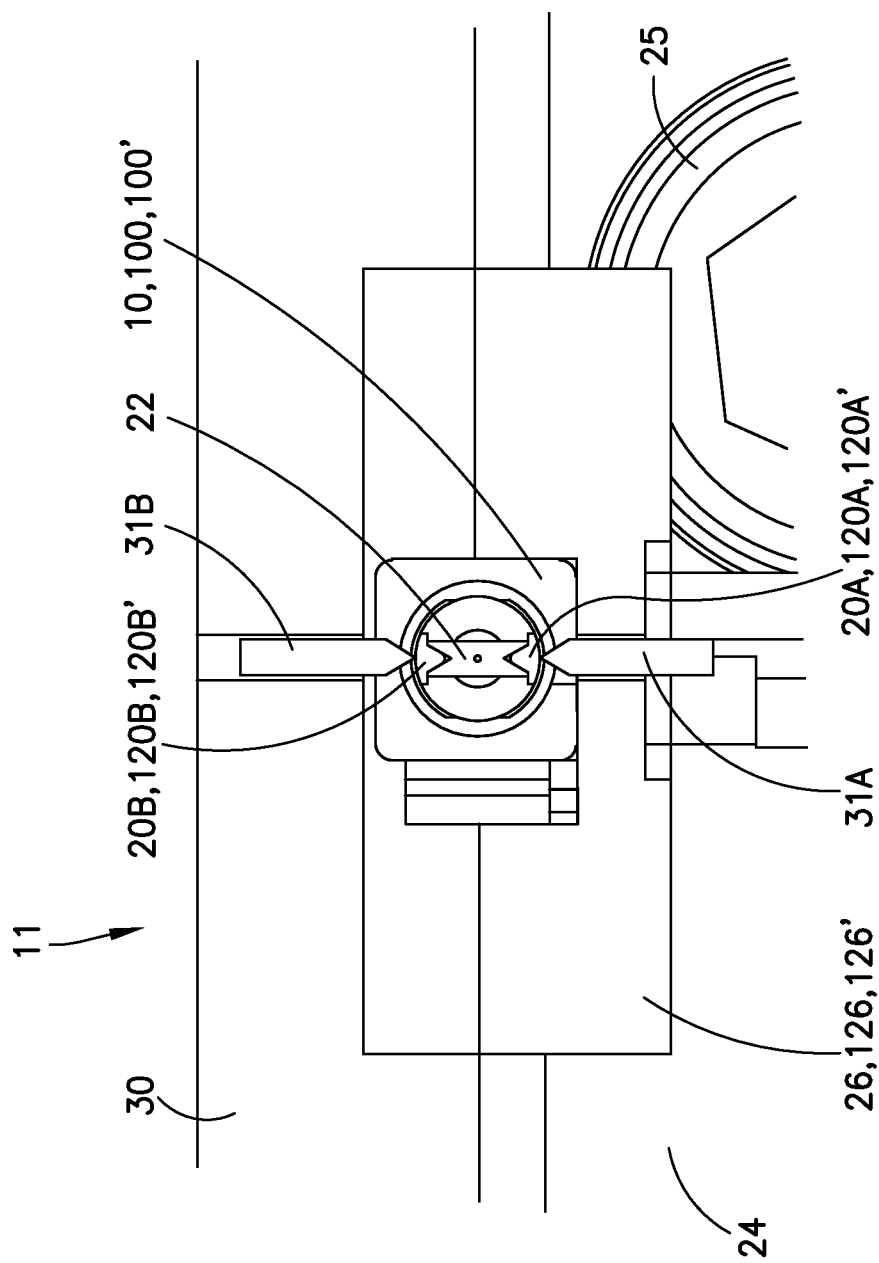
FIG. 6 is a front cross-sectional view of the exemplary fusion splice device of FIG. 5 with the connector member of FIG. 1 or FIG. 7 inserted therein.

Fusion splice device 11 typically includes first cover member 29 and second cover member 30, with the first and second cover members 29, 30 each being sized, shaped, and configured to interoperate with the first and second body members 23, 24, respectively, to provide a means for securing the optical cable 12 and the connector member 10 to the first and second body member 23, 24 (e.g., for purposes of facilitating field termination of the optical cable 12 with respect to the connector member 10, as discussed below). In general, first cover member 29 is hingedly connected to first body member 23, and second cover member 30 is hingedly connected to second body member 24. In certain exemplary embodiments and as shown in FIGS. 3 and 6, second cover member 30 includes at least one electrical contact 31B (e.g., mounted with respect to second cover member 30), and second body member 24 includes at least one electrical contact 31A (e.g., mounted with respect to second body member 24) (obscured by connector 10 in FIG. 3). However, it is to be noted that second cover member 30 may not include electrical contact 31A, and/or second body member may not include electrical contact 31B, as discussed further below (e.g., second cover member 30 may include electrode 320B and second body member 24 may include electrode 320A—FIG. 19).

In one embodiment and as shown in FIG. 6, electrical contacts 31A, 31B are spring-loaded electrical contacts. In this regard, when cover member 30 is open and after connector member 10 has been housed/positioned with respect to the second body member 24 via connector insert member/adapter 26, at least a portion of electrode 20A of connector member 10 is in close proximity to (e.g., adjacent to) and/or in contact/engagement with at least a portion of electrical contact 31A of second body member 24 (e.g., at least a portion of electrical contact 31A has been inserted/positioned within channel 65). After second cover member 30 is closed, at least a portion of electrode 20B of connector member 10 is in close proximity to (e.g., adjacent to) and/or in contact/engagement with at least a portion of electrical contact 31B of second cover member 30, with at least a portion of electrical contact 31B inserted/positioned within channel 67 (and at least a portion of electrode 20A of connector member 10 is still in close proximity to and/or in contact/engagement with at least a portion of electrical contact 31A of second body member 24). It is noted that the spring-loaded electrical contacts 31A, 31B provide for a fixed and/or pre-determined distance between electrodes 20A, 20B, whether second cover member 30 is open or closed.

In operation, fusion splice device 11 may be utilized to vertically, horizontally, and/or longitudinally align connector member 10 and at least a portion of the bare fiber portion 14 of optical cable 12 relative to each other to ensure that the end portion 14A of the bare fiber portion 14 is properly positioned in and/or adjacent to splice chamber 22 of connector member 10. In certain embodiments, the electrical contacts 31A, 31B and the electrodes 20A, 20B of connector member 10 may then be activated/energized via the internal circuitry within device 11 to commence the fusion process. During the fusion process, actuator member 25 may be activated to controllably (e.g., slowly) advance the bare fiber portion 14 with respect to the splice chamber 22 to facilitate effective fusion.

A user may utilize connector member 10 (or connector 100 or 200, discussed below) and fusion splice device 11 to terminate or fuse a broad variety of optical fibers. In exemplary embodiments, first a user would place or position the connector member 10 into connector insert member 26 of second body member 24 of the fusion splice device 11 (e.g., a handheld fusion splice device), and the stripped and cleaved fiber portion 14 would be inserted into or positioned relative to first body member 23 (e.g., a sled member), the first body member 23 being attached to the second body member 24 (FIG. 3). The first and second cover members 29, 30 would then be closed, thereby engaging/positioning the two electrical contacts 31A, 31B in contact or close proximity with the electrodes 20A, 20B, respectively, of the splice chamber 22 (FIGS. 4 and 6).

A switch 33 (e.g., a mechanical, electro-mechanical and/or electrical switch positioned on the second body member 24) would then be pushed or activated by a user. In exemplary embodiments, after the switch 33 was activated, first the fusion splice device 11 would be configured and adapted to advance the first body member 23 via the actuator member 25 until the end portion 14A of the bare fiber portion 14 is in contact/engagement with or in close proximity to the end portion 16A of the internal fiber stub 16 (FIG. 5). Alternatively, prior to activating switch 33, a user may utilize adjustment member 27 to advance the first body member 23 via the adjustment member 27 until the end portion 14A is in contact/engagement with or in close proximity to end portion 16A.

As shown in FIGS. 2 and 6, as the end portion 14A of fiber portion 14 moves into the body of the connector member 10, it is aligned with and/or positioned with respect to the end portion 16A of the fiber stub 16 through the alignment channel or lumen 43, and thereby is also in close proximity to the splice chamber 22 (and to electrical contacts 31A, 31B, and electrodes 20A, 20B). As noted, an integrated visual fault locator (VFL) 50 may be used to ensure that the end portion 14A of the bare fiber portion 14 is in proper location, contact and/or position with respect to the end portion 16A of the internal fiber stub 16 (FIG. 3).

In exemplary embodiments, after the first body member 23 was advanced until the end portion 14A of the bare fiber portion 14 is in contact/engagement with or in close proximity to the end portion 16A of the internal fiber stub 16, then the fusion splice device 11 is configured and adapted (e.g., via actuator member 25) to set/retract the first body member 23 back a pre-defined distance away from the second body member 24, thereby retracting the end portion 14A away from the end portion 16A a pre-defined distance (e.g., about 2 mm). This retraction of end portion 14A away from the end portion 16A a pre-defined distance thereby allows for the cleaning of the fibers 14A, 16A by the fusion splice device 11. In exemplary embodiments, after the end portion 14A was retracted away from the end portion 16A a pre-defined distance, the internal circuitry of the fusion splice device 11 is configured and adapted to apply a pre-fusion electrical arc (e.g., for about $\frac{1}{10}^{th}$ of a second) to the splice chamber 22 and to the end portions 14A, 16A via electrical contacts 31A, 31B and electrodes 20A, 20B to clean the end portions 14A, 16A.

In exemplary embodiments, after a brief delay after the pre-fusion arc was applied (e.g., a pre-determined delay of about 0.5 seconds), the fusion splice device 11 would then be configured and adapted to begin applying an electrical arc to end portions 14A, 16A via electrical contacts 31A, 31B and electrodes 20A, 20B, thereby causing the end portion 16A of the fiber stub 16 and the end portion 14A of the cleaved fiber end 14 to begin to heat and fuse together. In this position and after the electrical arc was applied to end portions 14A, 16A for a pre-determined amount of time (e.g., for about $\frac{3}{10}^{th}$ of a second), the fusion splice device 11 would then be configured and adapted to advance the first body member 23 (e.g., by use of the actuator member 25) toward the second body member 24 at a predetermined rate and for a pre-determined distance (e.g., at a rate of about 0.2 mm/sec, and over a distance of about 0.065 mm+/−0.01 mm) as the electrical arc is applied to the end portions 14A, 16A via electrical contacts 31A, 31B and electrodes 20A, 20B, thereby causing the end portion 16A of the fiber stub 16 and the end portion 14A of the cleaved fiber end 14 to begin to heat and fuse together. In exemplary embodiments, the resultant fused connector meets the current TIA/EIA-604-10; 568-C.3; 455-1, -4, -5, -6, -13, -21, -36, -107, -171, -188 and/or GR-326-CORE Standards.

In exemplary embodiments, after the fusion splice device 11 advanced the first body member 23 toward the second body member 24 at a pre-determined rate and for a pre-determined distance while applying the electrical arc to end portions 14A, 16A, the device 11 would then be configured and adapted to check/test the splice loss of the fusion weld of the fused connector (e.g., connector member 10 fused to cable 12). If the splice loss is less than 0.5 dB, the device 11 would then be configured and adapted to check/test the proof test level of the fusion weld to 20 kpsi. However, if the splice loss of the fusion weld were greater than 0.5 dB, then an LED light associated with the device 11 would indicate that the fused connector had an unacceptable/inadequate fusion weld. If the proof test level of the fusion weld were determined by device 11 to be less than 20 kpsi, then another LED light associated with the device 11 would indicate that the fused connector had an unacceptable/inadequate fusion weld. However, if the proof test level of the fusion weld was acceptable/adequate up to 20 kpsi, then another LED light associated with device 11 would indicate that the fused connecter had an acceptable/adequate fusion weld. The device 11 would then record the above results and then shut down. In general, a user would then open cover members 29, 30 and remove the fused connector from device 11.

In exemplary embodiments, the fused connector typically has a cap member 90 or the like mounted with respect to connector member 10 (e.g., mounted with respect to ferrule adapter/retainer member 19, connector housing 13 and/or ferrule 15) (see, e.g., FIGS. 7-18). In general, mounted cap member 90 or the like is configured and dimensioned to substantially prevent dust, dirt and/or debris or the like from entering/contaminating connector member 10.

Turning now to FIGS. 7-10 (and FIGS. 3-5), an alternative connector member 100 (e.g., a fusion splice optical fiber connector member) for use with exemplary fusion splice device 11 in accordance with embodiments of the present disclosure is shown. The connector member 100 may be structurally and functionally similar to the connector member 10 discussed above with reference to FIGS. 1-2, with some differences.

Similar to connector member 10, the connector member 100 may be a fiber LC stub connector member and the fusion splice device 11 may be a handheld fusion splice unit, although the present disclosure is not limited thereto. Alternatively, connector member 100 may be another type of connector member, such as, for example, a SC, ST, FC, MPO, MT-RJ, MU, DIN, E2000, Mil-38999 or FDDI connector member.

Similar to connector member 10, the connector member 100 is configured and dimensioned for use in terminating or fusing optical cables/fibers 12 or the like. As such, connector member 100 and fusion splice device 11 may be used to achieve field termination of connector member 100 with respect to an optical cable 12. As noted above, optical cable 12 typically includes a bare fiber portion 14 (e.g., stripped and cleaved) that terminates at end portion 14A. In exemplary embodiments, at least a portion of bare fiber portion 14, including end portion 14A, is configured and dimensioned to be inserted into a first end 141 of connector member 100.

Connector member 100 typically includes a connector housing/body 113, a coupling attachment 117 and a spring 118. Coupling attachment 117 typically is configured and dimensioned to be mounted with respect to a strain relief boot 70 or the like (see, e.g., FIGS. 7-18). In exemplary embodiments, housing 113 defines a first electrical contact port or channel 165, and a second electrical contact port or channel 167. In general, channels 165, 167 are configured and dimensioned to allow at least of portion of electrical contacts 31A, 31B, respectively, to be inserted within at least a portion of channels 165, 167, as discussed further below.

Connector member 100 typically also includes a ferrule 15 at least partially disposed within the connector housing 113, the ferrule 15 typically having a fiber stub 16 installed and/or positioned therein. As noted above in connection with connector member 10, fiber stub 16 typically extends from end portion 16A to end portion 16B. In exemplary embodiments, end portion 16B is pre-polished, and end portion 16A is cleaved (e.g., factory cleaved).

In exemplary embodiments and as shown in FIGS. 7-10, connector member 100 includes two electrodes 120A and 120B, a fiber alignment and retainer member 121 (e.g., a V-groove member), and an anvil member 160 housed within at least a portion of housing 113. Anvil member 160 typically includes first and second compression members 161, 162, the first and second compression members 161, 162 typically being fabricated from plastic or a resilient material or the like. In one embodiment, compression members 161, 162 are fabricated from a thermally stable material having a low coefficient of friction so the fibers 14, 16 can easily slide and/or be positioned underneath compression members 161, 162. However, it is noted that compression members 161, 162 can take a variety of forms, e.g., ball-bearing members, spring members, etc.

In exemplary embodiments, first and second compression members 161, 162 are configured and dimensioned to engage, compress and/or house/position at least a portion of fiber portion 14 and fiber stub 16, respectively (e.g., so that at least a portion of the fibers 14, 16 lay down and/or are positioned at least partially within lumens 143, 145, respectively).

In general, the two electrodes 120A and 120B, the anvil member 160, and the fiber alignment and retainer member 121 are configured and dimensioned to define an arc or splice chamber 122 with fiber alignment (e.g., alignment of end portions 14A and 16A). Fiber alignment and retainer member 121 also is typically configured to retain, position and/or house the ferrule 15 at least partially disposed within the connector housing 13.

Figure 9:
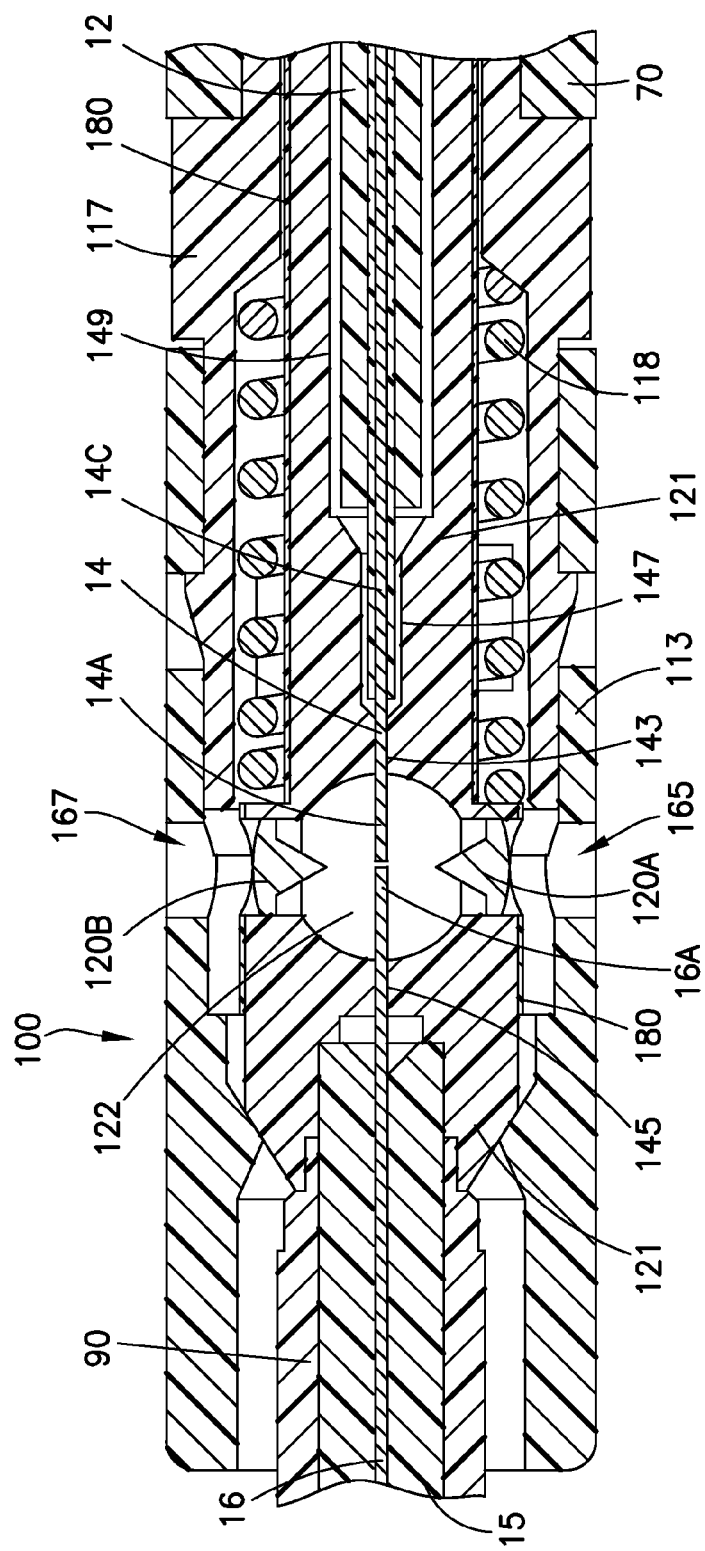
FIG. 9 is a partial exploded view of the exemplary connector member of FIG. 7A.
Figure 10:
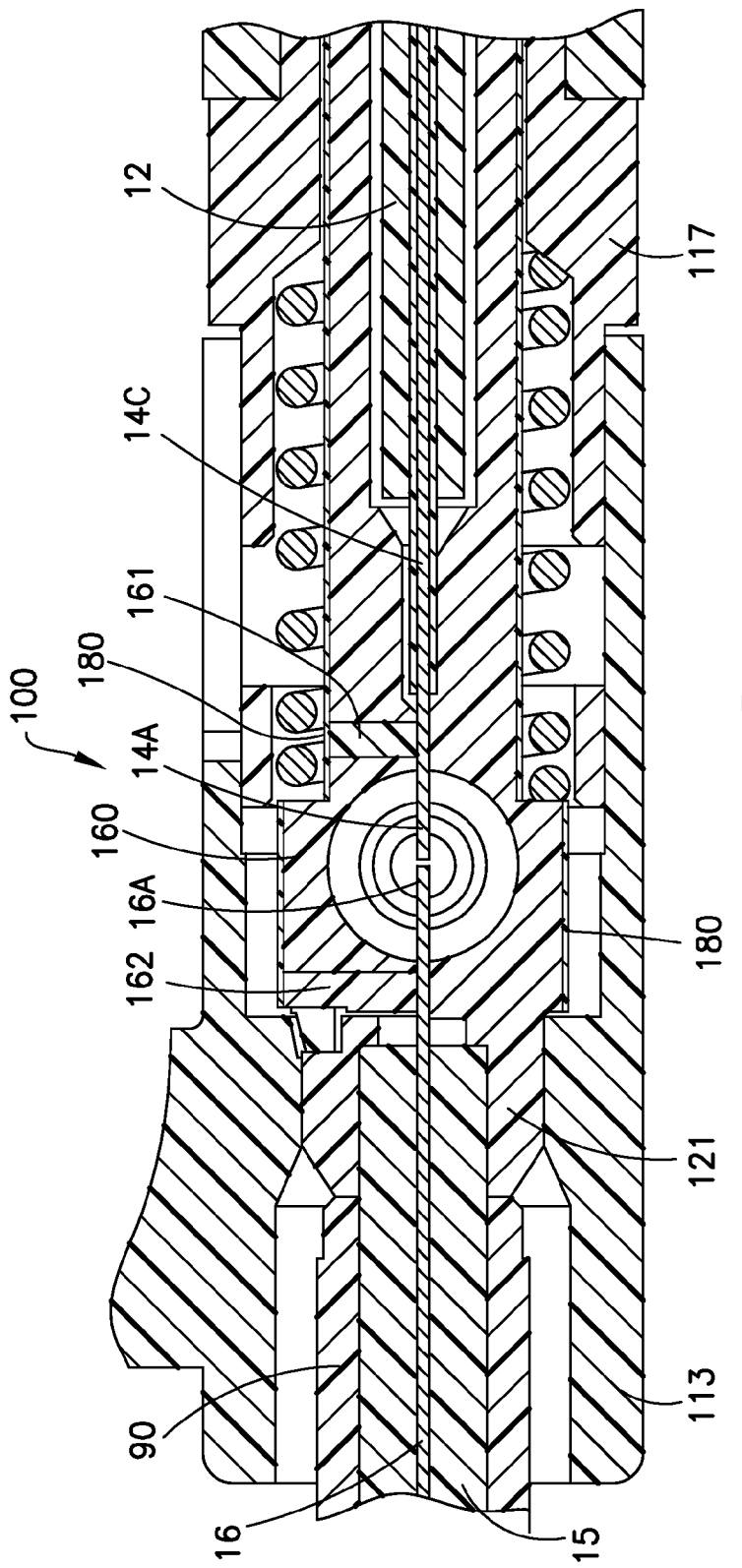
FIG. 10 is a partial exploded view of the exemplary connector member of FIG. 8A.
Figure 13:
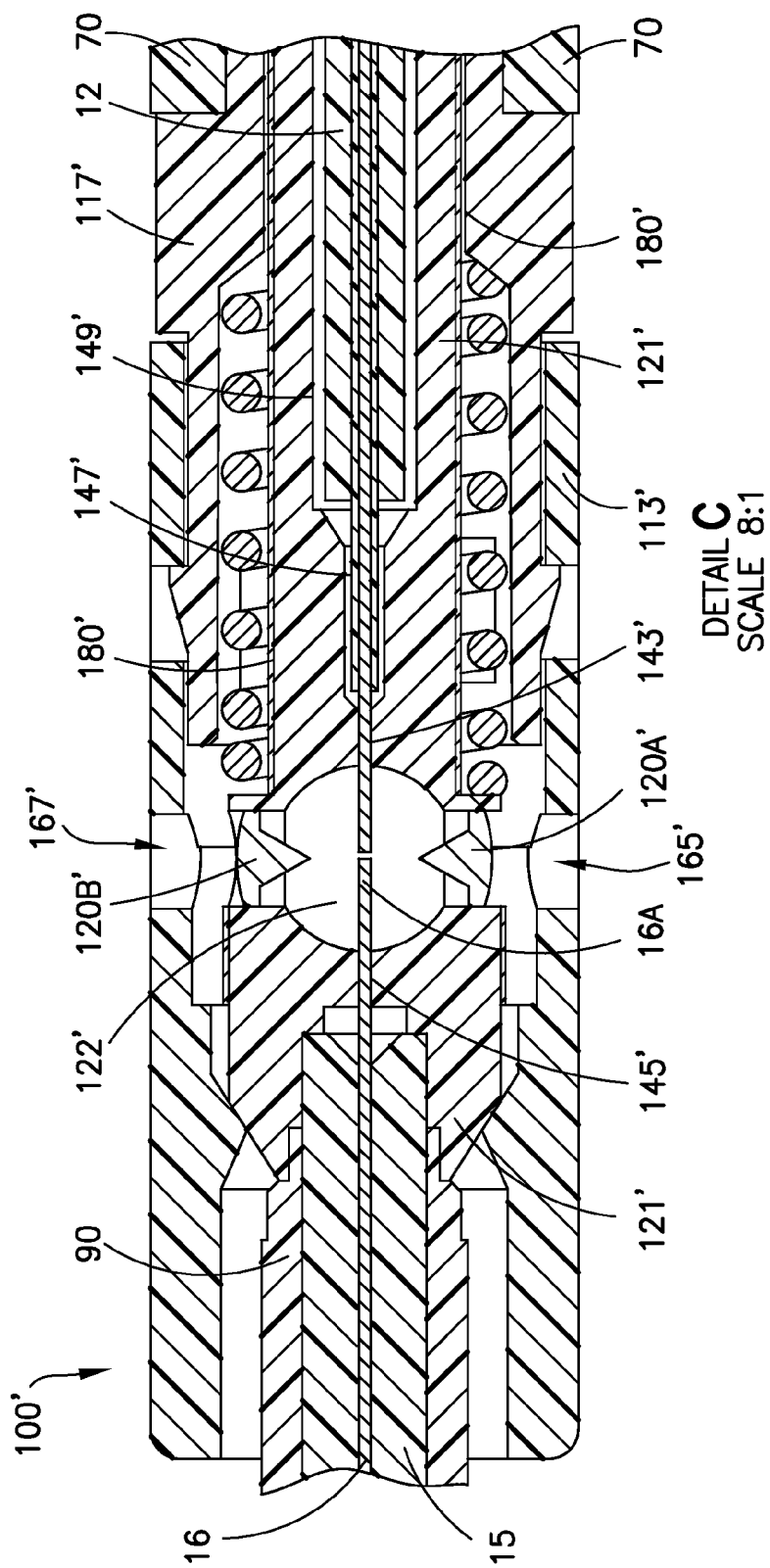
FIG. 13 is a partial exploded view of the exemplary connector member of FIG. 11A.
Figure 14:
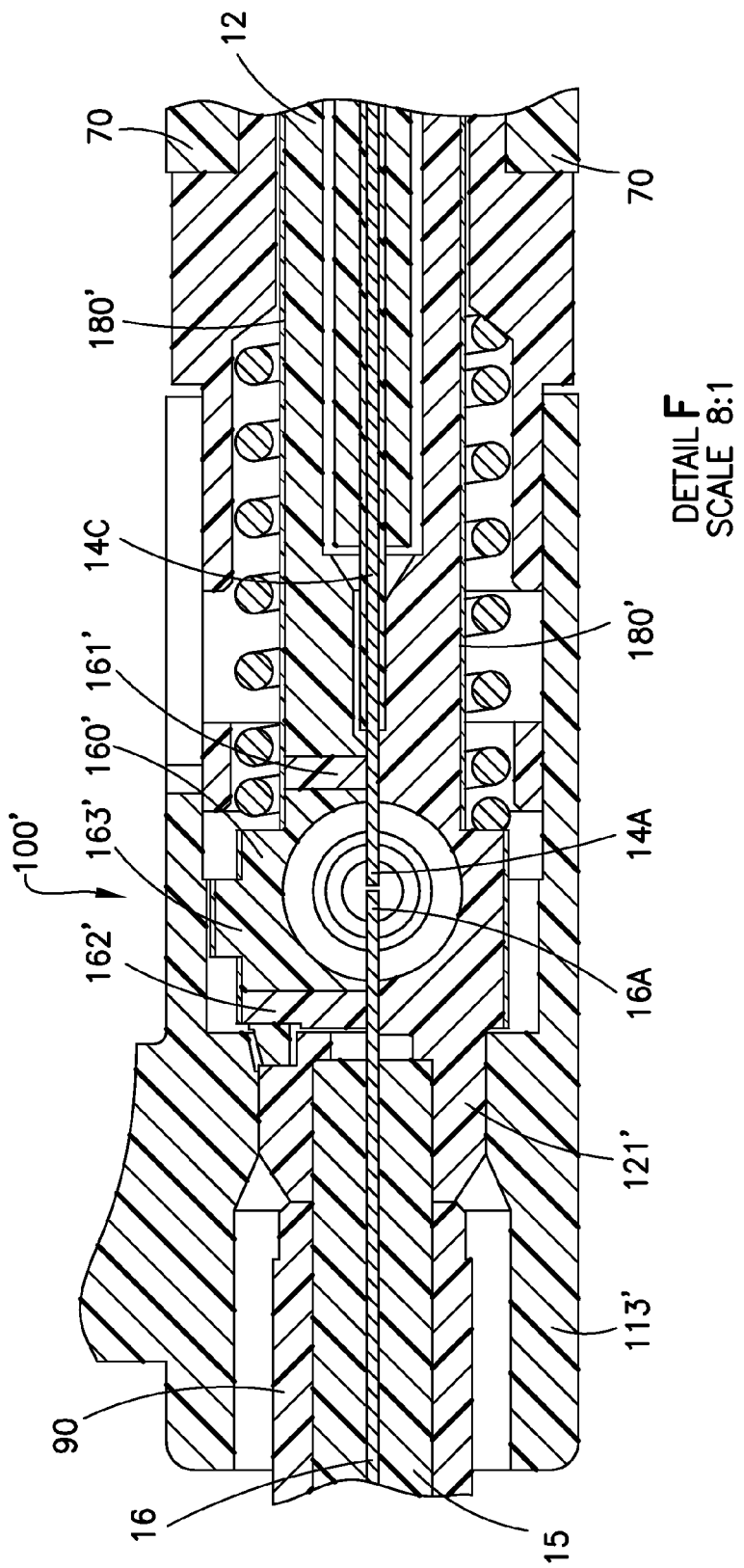
FIG. 14 is a partial exploded view of the exemplary connector member of FIG. 12A.
Figure 16:
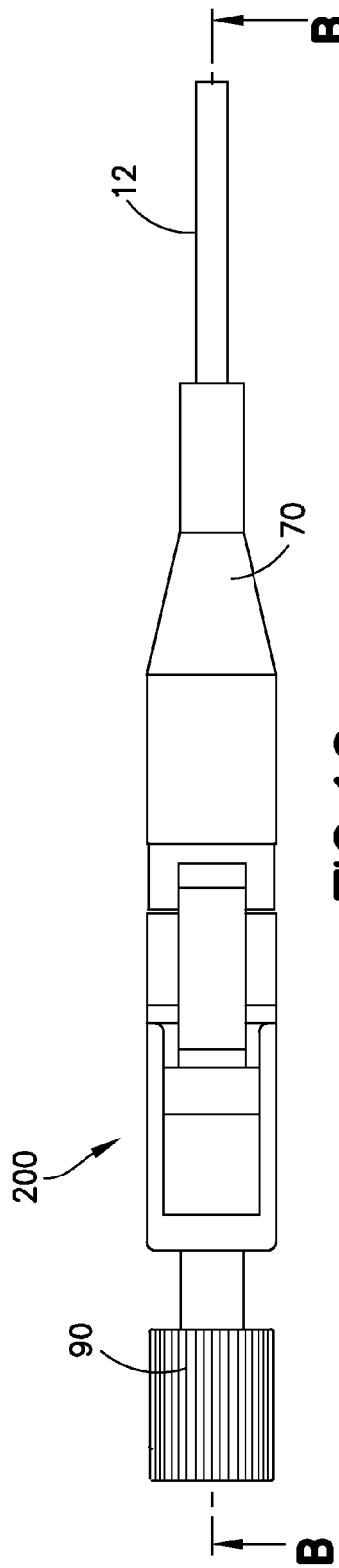
FIG. 16 is a top view of the connector member of FIG. 15.
Figure 16A:
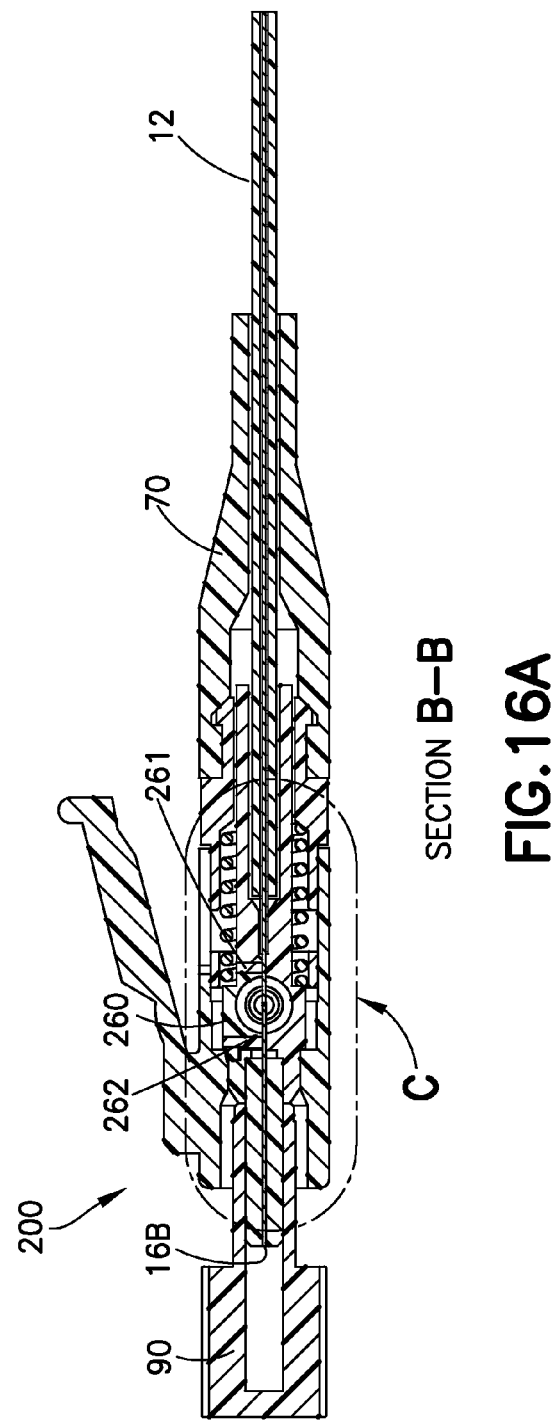
FIG. 16A is a cross-sectional view of the connector member of FIG. 16 taken substantially along the line B-B.

In one embodiment and as shown in FIGS. 9-10, fiber alignment and retainer member 121 defines (i) at least a portion of a first alignment lumen, channel or tube 143 inside connector housing 113 that is configured to receive and/or align at least a portion of bare fiber portion 14, (ii) at least a portion of a second alignment lumen, channel or tube 147 inside connector housing 113 that is configured to receive and/or align at least a portion of fiber portion 14C, fiber portion 14C having the buffer or insulation portion of cable 12 removed therefrom and including a coating or the like on fiber portion 14C, and (iii) at least a portion of a third alignment lumen, channel or tube 149 at least partially inside connector housing 113 that is configured to receive and/or align at least a portion of cable 12.

Similarly, anvil member 160 typically defines: (i) at least a portion of second alignment lumen 147 inside connector housing 113 that is configured to receive and/or align at least a portion of fiber portion 14C, and (ii) at least a portion of third alignment lumen 149 at least partially inside connector housing 113 that is configured to receive and/or align at least a portion of cable 12.

In exemplary embodiments, fiber alignment and retainer member 121 also defines a fourth alignment lumen, channel or tube 145 inside connector housing 113 that is configured to receive and/or align at least a portion of fiber stub 16. In general, lumens 143, 145, 147 and/or 149 are configured and dimensioned to receive and/or align end portions 14A and 16A in close proximity to one another and in close proximity to the pair of electrodes 120A, 120B at or near the splice chamber 122.

As noted above, an integrated visual fault locator (VFL) 50 (FIG. 3) may be used to ensure that end portion 14A of the bare fiber portion 14 is in proper location, contact and/or position with respect to the end portion 16A of the internal fiber stub 16. For example, a photo-detector or the like may be mounted with respect to and/or associated with VFL 50 (e.g., via an optical splitter) and be utilized to detect the back-reflected light from VFL 50 in splice chamber 122 to facilitate the proper positioning of end portions 14A, 16A relative to one another.

In one embodiment, electrodes 120A and 120B are integrated electrodes (e.g., integrated and/or integral with respect to the fiber alignment and retainer member 121 and/or to the housing 113) that are aligned in the vicinity of the splice chamber 122. In alternative embodiments and as further discussed below, other connector members (e.g., connector member 200) without integrated electrodes 120A, 120B may be utilized with device 11, with the electrodes (e.g., electrodes 320A, 320B) utilized during the fusion process being positioned/located and/or associated with respect to fusion splice device 11.

Similar to as described above, fusion splice device or arc generator device 11 typically includes internal circuitry for generating a fusion splice arc or electrical arc which is transferred to the connector splice chamber 122 via electrical contacts 31A, 31B and electrodes 120A, 120B (or via electrodes 320A, 320B, as discussed further below). In one embodiment, the internal circuitry of the fusion splice device 11 sends/applies electrical energy to electrical contacts 31A, 31B, which, in turn, send/apply electrical energy across electrodes 120A, 120B to create a fusion splice arc in the splice chamber 122, thereby causing the end portion 16A of the fiber stub 16 and the end portion 14A of the cleaved fiber end 14 to heat and fuse together.

In exemplary embodiments, first body member 23 is configured and dimensioned to support at least a portion of optical cable 12 and/or bare fiber portion 14, and second body member 24 is configured and dimensioned to support, house and/or receive connector member 100. Similar to as previously described, actuator member 25 is configured and adapted to slowly advance the bare fiber portion 14 supported by the first body member 23 relative to the splice chamber 122 of connector member 100 during the fusing process.

In one embodiment, fusion splice device 11 typically includes connector insert member/adapter 126 (e.g., an interchangeable block or adapter plate) that is sized, shaped, and configured to receive, house and/or support connector member 100 within and with respect to the second body member 24, and to position and orient the connector member 100 appropriately with respect to the optical cable 12, including with respect to the bare fiber portion 14 of optical cable 12. As noted above, connector insert member 126 may be removed and replaced with one or more of a plurality of differently-configured connector insert members or blocks (e.g., insert members 26 or 226) to advantageously facilitate use of device 11 with respect to a wide variety of differently-configured optical fiber connector members (e.g., connector members 10 or 200).

Figure 8:
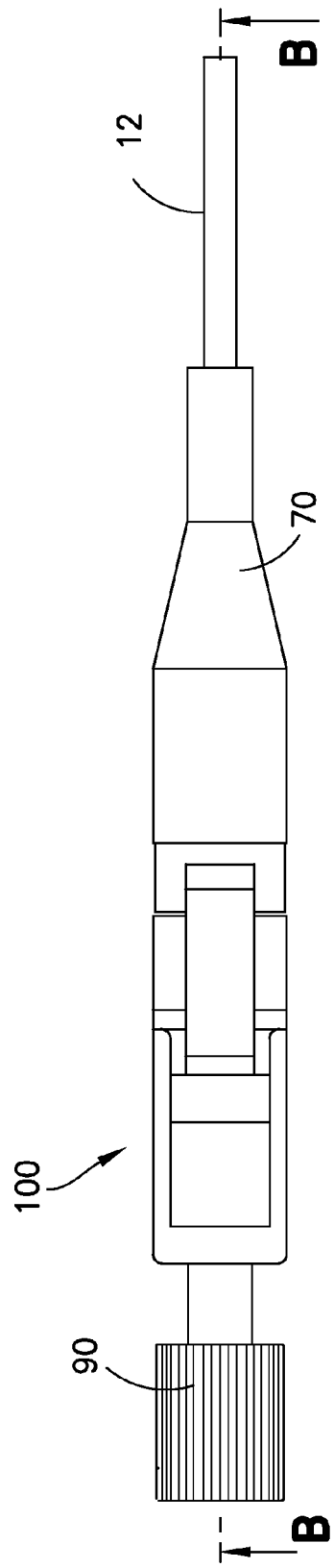
FIG. 8 is a top view of the connector member of FIG. 7.
Figure 8A:
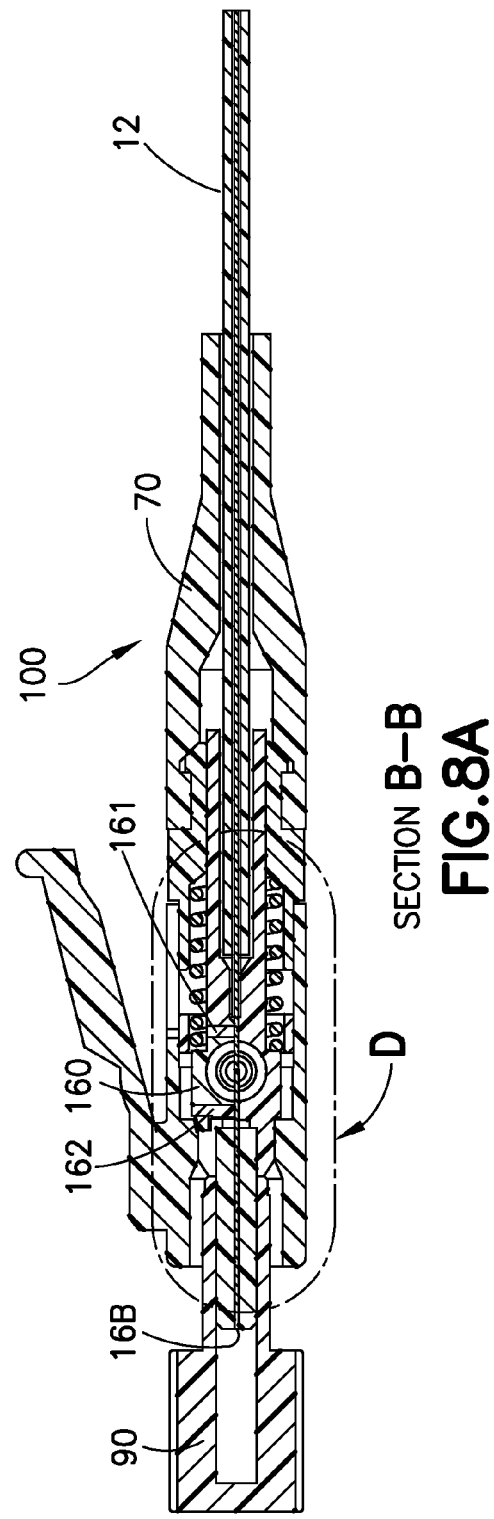
FIG. 8A is a cross-sectional view of the connector member of FIG. 8 taken substantially along the line B-B.

Before or after connector member 100 is housed/positioned with respect to second body member 24 via connector insert member/adapter 126, a user would typically insert/position at least a portion of an insert member (e.g., a knife-like or pin-like insert member) into receiving opening 177 of housing 113 of connector member 100 to engage the anvil member 160 and move (e.g., ramp or cam) the anvil member 160 (e.g., upwards in FIG. 8A) away from end portion 16A. In general, this movement of anvil member 160 (e.g., movement of about 0.005 inches) creates a gap that opens up and/or defines at least a portion of lumen/channel 143, so that at least a portion of bare fiber portion 14 may be received/housed within now open lumen/channel 143. Before or after fusion of end portions 14A, 16A, the knife or pin-like insert member would be removed from receiving opening 177, thereby causing (e.g., via compression/engagement from resilient member 180) the anvil member 160 (e.g., compression member 161 and/or 162) to engage with and/or press against at least a portion of end portions 14A and/or 16A, fiber portion 14, and/or against fiber alignment and retainer member 121. In general, resilient member 180 is positioned at least partially around retainer member 121 and anvil member 160. In exemplary embodiments, resilient member 180 is a resilient tubular member, e.g., a heat shrink sleeve or overmolded tubular member or the like, although the present disclosure is not limited thereto.

As similarly noted above with respect to connector member 10, first and second cover members 29, 30 are each typically sized, shaped, and configured to interoperate with the first and second body members 23, 24, respectively, to provide a means for securing the optical cable 12 and the connector member 100 to the first and second body member 23, 24 (e.g., for purposes of facilitating field termination of the optical cable 12 with respect to the connector member 100). As noted above and in certain exemplary embodiments, second cover member 30 includes at least one electrical contact 31B, and second body member 24 includes at least one electrical contact 31A (obscured by connector 10 in FIG. 3). However, it is to be noted that second cover member 30 may not include electrical contact 31A, and/or second body member may not include electrical contact 31B, as discussed further below (e.g., second cover member 30 may include electrode 320B and second body member 24 may include electrode 320A—FIG. 15).

In one embodiment and as noted above, electrical contacts 31A, 31B are spring-loaded electrical contacts. In this regard, when cover member 30 is open and after connector member 100 has been housed/positioned with respect to the second body member 24 via connector insert member/adapter 126, at least a portion of electrode 120A of connector member 100 is in close proximity to (e.g., adjacent to) and/or in contact/engagement with at least a portion of electrical contact 31A of second body member 24 (e.g., at least a portion of electrical contact 31A has been inserted/positioned within channel 165). After second cover member 30 is closed, at least a portion of electrode 120B of connector member 100 is in close proximity to (e.g., adjacent to) and/or in contact/engagement with at least a portion of electrical contact 31B of second cover member 30, with at least a portion of electrical contact 31B inserted/positioned within channel 167 (and at least a portion of electrode 120A of connector member 100 is still in close proximity to and/or in contact/engagement with at least a portion of electrical contact 31A of second body member 24). It is noted that the spring-loaded electrical contacts 31A, 31B provide for a fixed and/or pre-determined distance between electrodes 120A, 120B, whether second cover member 30 is open or closed.

In operation, fusion splice device 11 may be utilized to vertically, horizontally, and/or longitudinally align connector member 100 and at least a portion of the bare fiber portion 14 of optical cable 12 relative to each other to ensure that the end portion 14A of the bare fiber portion 14 is properly positioned in and/or adjacent to splice chamber 122 of connector member 100. In certain embodiments, the electrical contacts 31A, 31B and the electrodes 120A, 120B of connector member 100 may then be activated/energized via the internal circuitry within device 11 to commence the fusion process. During the fusion process, actuator member 25 may be activated to controllably (e.g., slowly) advance the bare fiber portion 14 with respect to the splice chamber 122 to facilitate effective fusion.

A user may utilize connector member 100 (or connector 10 or 200, discussed below) and fusion splice device 11 to terminate or fuse a broad variety of optical fibers. In exemplary embodiments, first a user would place or position the connector member 100 into connector insert member 126 of second body member 24 of the fusion splice device 11 (e.g., a handheld fusion splice device), and the stripped and cleaved fiber portion 14 would be inserted into or positioned relative to first body member 23 (e.g., a sled member), the first body member 23 being attached to the second body member 24 (FIG. 3). The first and second cover members 29, 30 would then be closed, thereby engaging/positioning the two electrical contacts 31A, 31B in contact or close proximity with the electrodes 120A, 120B, respectively, of the splice chamber 122 (FIGS. 6 and 9).

A switch 33 would then be pushed or activated by a user. In exemplary embodiments, after the switch 33 was activated, first the fusion splice device 11 would be configured and adapted to advance the first body member 23 via the adjustment member 27 until the end portion 14A of the bare fiber portion 14 is in contact/engagement with or in close proximity to the end portion 16A of the internal fiber stub 16.

As shown in FIGS. 6 and 9, as the end portion 14A of fiber portion 14 moves into the body of the connector member 100, it is aligned with and/or positioned with respect to the end portion 16A of the fiber stub 16 through the alignment channel or lumen 143, and thereby is also in close proximity to the splice chamber 122 (and to electrical contacts 31A, 31B, and electrodes 120A, 120B). As noted, an integrated visual fault locator (VFL) 50 may be used to ensure that the end portion 14A of the bare fiber portion 14 is in proper location, contact and/or position with respect to the end portion 16A of the internal fiber stub 16 (FIG. 3).

In exemplary embodiments, after the first body member 23 was advanced until the end portion 14A of the bare fiber portion 14 is in contact/engagement with or in close proximity to the end portion 16A of the internal fiber stub 16, then the fusion splice device 11 is configured and adapted to set/retract the first body member 23 back a pre-defined distance away from the second body member 24, thereby retracting the end portion 14A away from the end portion 16A a pre-defined distance (e.g., about 2 mm). This retraction of end portion 14A away from the end portion 16A a pre-defined distance thereby allows for the cleaning of the fibers 14A, 16A by the fusion splice device 11. In exemplary embodiments, after the end portion 14A was retracted away from the end portion 16A a pre-defined distance, the internal circuitry of the fusion splice device 11 is configured and adapted to apply a pre-fusion electrical arc (e.g., for about $1/10^{th}$ of a second) to the splice chamber 122 and to the end portions 14A, 16A via electrical contacts 31A, 31B and electrodes 120A, 120B to clean the end portions 14A, 16A.

In exemplary embodiments, after a brief delay after the pre-fusion arc was applied (e.g., a delay of about 0.5 seconds), the fusion splice device 11 would then be configured and adapted to begin applying an electrical arc to end portions 14A, 16A via electrical contacts 31A, 31B and electrodes 120A, 120B, thereby causing the end portion 16A of the fiber stub 16 and the end portion 14A of the cleaved fiber end 14 to begin to heat and fuse together. In this position and after the electrical arc was applied to end portions 14A, 16A for a pre-determined amount of time (e.g., for about $3/10^{th}$ of a second), the fusion splice device 11 would then be configured and adapted to advance the first body member 23 (e.g., by use of the actuator member 25) toward the second body member 24 at a predetermined rate and for a pre-determined distance (e.g., at a rate of about 0.2 mm/sec, and over a distance of about 0.065 mm+/−0.01 mm) as the electrical arc is applied to the end portions 14A, 16A via electrical contacts 31A, 31B and electrodes 120A, 120B, thereby causing the end portion 16A of the fiber stub 16 and the end portion 14A of the cleaved fiber end 14 to begin to heat and fuse together. In exemplary embodiments, the resultant fused connector meets the current TIA/EIA-604-10; 568-C.3; 455-1, -4, -5, -6, -13, -21, -36, -107, -171, -188 and/or GR-326-CORE Standards.

In exemplary embodiments, after the fusion splice device 11 advanced the first body member 23 toward the second body member 24 at a pre-determined rate and for a pre-determined distance while applying the electrical arc to end portions 14A, 16A, the device 11 would then be configured and adapted to check/test the splice loss of the fusion weld of the fused connector (e.g., connector member 100 fused to cable 12). If the splice loss is less than 0.5 dB, the device 11 would then be configured and adapted to check/test the proof test level of the fusion weld to 20 kpsi. However, if the splice loss of the fusion weld were greater than 0.5 dB, then an LED light associated with the device 11 would indicate that the fused connector had an unacceptable/inadequate fusion weld. If the proof test level of the fusion weld were determined by device 11 to be less than 20 kpsi, then another LED light associated with the device 11 would indicate that the fused connector had an unacceptable/inadequate fusion weld. However, if the proof test level of the fusion weld was acceptable/adequate up to 20 kpsi, then another LED light associated with device 11 would indicate that the fused connecter had an acceptable/adequate fusion weld. The device 11 would then record the above results and then shut down. In general, a user would then open cover members 29, 30 and remove the fused connector from device 11.

In exemplary embodiments, the fused connector typically has a cap member 90 or the like mounted with respect to connector member 100 (e.g., mounted with respect to fiber alignment and retainer member 121, connector housing 113, and/or ferrule 15) (see, e.g., FIGS. 7-14). In general, mounted cap member 90 or the like is configured and dimensioned to substantially prevent dust, dirt and/or debris or the like from entering/contaminating connector member 100.

In an alternative embodiment and as shown in FIGS. 11-14, connector member 100' for use with exemplary fusion splice device 11 in accordance with embodiments of the present disclosure is shown. The connector member 100' may be structurally and functionally similar to the connector member 100, with some differences. Similar to connector member 100, the connector member 100' is configured and dimensioned for use in terminating or fusing optical cables/fibers 12 or the like. As such, connector member 100' and fusion splice device 11 may be used to achieve field termination of connector member 100 with respect to an optical cable 12.

Connector member 100 typically includes a connector housing/body 113', a coupling attachment 117' and a spring 118'. Connector member 100 typically also includes a ferrule 15 at least partially disposed within the connector housing 113', the ferrule 15 typically having a fiber stub 16 installed and/or positioned therein.

In exemplary embodiments, connector member 100' includes two electrodes 120A' and 120B', a fiber alignment and retainer member 121', and an anvil member 160' housed within at least a portion of housing 113'. Anvil member 160 typically includes first and second compression members 161', 162', and an engagement member or protuberance 163'.

Similar to connector member 100, the two electrodes 120A' and 120B', the anvil member 160', and the fiber alignment and retainer member 121' are configured and dimensioned to define an arc or splice chamber 122' with fiber alignment. In exemplary embodiments, housing 113' defines a first electrical contact port or channel 165', and a second electrical contact port or channel 167'. In general, channels 165', 167' are configured and dimensioned to allow at least of portion of electrical contacts 31A, 31B, respectively, to be inserted within at least a portion of channels 165', 167', as discussed further below.

In one embodiment, fiber alignment and retainer member 121' defines (i) at least a portion of a first alignment lumen, channel or tube 143' inside connector housing 113' that is configured to receive and/or align at least a portion of bare fiber portion 14, (ii) at least a portion of a second alignment lumen, channel or tube 147' inside connector housing 113' that is configured to receive and/or align at least a portion of fiber portion 14C, and (iii) at least a portion of a third alignment lumen, channel or tube 149' at least partially inside connector housing 113' that is configured to receive and/or align at least a portion of cable 12.

Similarly, anvil member 160 typically defines: (i) at least a portion of second alignment lumen 147' inside connector housing 113' that is configured to receive and/or align at least a portion of fiber portion 14C, and (ii) at least a portion of third alignment lumen 149' at least partially inside connector housing 113' that is configured to receive and/or align at least a portion of cable 12.

In exemplary embodiments, fiber alignment and retainer member 121' also defines a fourth alignment lumen, channel or tube 145' inside connector housing 113' that is configured to receive and/or align at least a portion of fiber stub 16.

Similar to as described above, fusion splice device or arc generator device 11 typically includes internal circuitry for generating a fusion splice arc or electrical arc which is transferred to the connector splice chamber 122' via electrical contacts 31A, 31B and electrodes 120A', 120B'. In one embodiment, the internal circuitry of the fusion splice device 11 sends/applies electrical energy to electrical contacts 31A, 31B, which, in turn, send/apply electrical energy across electrodes 120A', 120B' to create a fusion splice arc in the splice chamber 122', thereby causing the end portion 16A of the fiber stub 16 and the end portion 14A of the cleaved fiber end 14 to heat and fuse together.

As similarly noted above with respect to connector member 100, first and second cover members 29, 30 are each typically sized, shaped, and configured to interoperate with the first and second body members 23, 24, respectively, to provide a means for securing the optical cable 12 and the connector member 100' to the first and second body member 23, 24. In certain exemplary embodiments, second cover member 30 includes at least one electrical contact 31B, and second body member 24 includes at least one electrical contact 31A.

In one embodiment and as noted above, electrical contacts 31A, 31B are spring-loaded electrical contacts. In this regard, when cover member 30 is open and after connector member 100' has been housed/positioned with respect to the second body member 24 via connector insert member/adapter 126', at least a portion of electrode 120A' of connector member 100' is in close proximity to (e.g., adjacent to) and/or in contact/engagement with at least a portion of electrical contact 31A of second body member 24 (e.g., at least a portion of electrical contact 31A has been inserted/positioned within channel 165'). After second cover member 30 is closed, at least a portion of electrode 120B' of connector member 100' is in close proximity to (e.g., adjacent to) and/or in contact/engagement with at least a portion of electrical contact 31B of second cover member 30, with at least a portion of electrical contact 31B inserted/positioned within channel 167'.

In exemplary embodiments, as the second cover member 30 is closed and as at least a portion of electrical contact 31B is inserted within channel 167', the electrical contacts 31A, 31B are configured and dimensioned to engage the engagement or protuberance member 163' of anvil member 160' to thereby move (e.g., ramp or cam) the anvil member 160' upwards away from end portion 16A. In general, this movement of anvil member 160' (e.g., movement of about 0.005 inches) creates a gap that opens up and/or defines at least a portion of lumen/channel 143', so that at least a portion of bare fiber portion 14 may be received within now open lumen/channel 143'.

In general, after fusion of end portions 14A, 16A, the electrical contacts 31A, 31B are removed from channels 165', 167', thereby causing (e.g., via compression/engagement from resilient member 180') the anvil member 160' (e.g., compression member 161' and/or 162') to engage with and/or press against at least a portion of end portions 14A and/or 16A, fiber portion 14, and/or against fiber alignment and retainer member 121'.

In certain embodiments, the electrical contacts 31A, 31B and the electrodes 120A', 120B' of connector member 100' may then be activated/energized via the internal circuitry within device 11 to commence the fusion process. During the fusion process, actuator member 25 may be activated to controllably (e.g., slowly) advance the bare fiber portion 14 with respect to the splice chamber 122' to facilitate effective fusion. A user may utilize connector member 100' and fusion splice device 11 to terminate or fuse a broad variety of optical fibers, as similarly described above.

In alternative embodiments and as noted above and as further discussed below, other connector members (e.g., connector member 200) without integrated electrodes 20A, 20B (or 120A, 120B) may be utilized with device 11, with the electrodes (e.g., electrodes 320A, 320B) utilized during the fusion process being positioned/located and/or associated/mounted with respect to fusion splice device 11.

Turning now to FIGS. 15-19 (and FIGS. 3-5), an alternative connector member 200 (e.g., a fusion splice optical fiber connector member) for use with exemplary fusion splice device 11 in accordance with embodiments of the present disclosure is shown. The connector member 200 may be structurally and functionally similar to the connector member 10 and/or 100 discussed above, with some differences. Similar to connector member 10, the connector member 200 may be a fiber LC stub connector member and the fusion splice device 11 may be a handheld fusion splice unit. Alternatively, connector member 100 may be another type of connector member, such as, for example, a SC, ST, FC, MPO, MT-RJ, MU, DIN, E2000, Mil-38999 or FDDI connector member.

Similar to connector member 10, the connector member 200 is configured and dimensioned for use in terminating or fusing optical cables/fibers 12 or the like. As such, connector member 200 and fusion splice device 11 may be used to achieve field termination of connector member 200 with respect to an optical cable 12. As noted above, optical cable 12 typically includes a bare fiber portion 14 that terminates at end portion 14A. In exemplary embodiments, at least a portion of bare fiber portion 14, including end portion 14A, is configured and dimensioned to be inserted into a first end 241 of connector member 200.

Connector member 200 typically includes a connector housing/body 213, a coupling attachment 217 and a spring 218. Coupling attachment 217 typically is configured and dimensioned to be mounted with respect to a strain relief boot 70 or the like (see, e.g., FIGS. 15-18).

Connector member 200 typically also includes a ferrule 15 at least partially disposed within the connector housing 213, the ferrule 15 typically having a fiber stub 16 installed and/or positioned therein. As noted above in connection with connector member 10, fiber stub 16 typically extends from end portion 16A to end portion 16B. In exemplary embodiments, end portion 16B is pre-polished, and end portion 16A is cleaved.

In exemplary embodiments and as shown in FIGS. 15-18, connector member 200 includes a fiber alignment and retainer member 221 (e.g., a V-groove member) and an anvil member 260 housed within at least a portion of housing 213. Anvil member 260 typically includes first and second compression members 261, 262, the first and second compression members 261, 262 typically being fabricated from plastic or a resilient material or the like. In exemplary embodiments, first and second compression members 261, 262 are configured and dimensioned to engage, compress and/or house/position at least a portion of fiber portion 14 and fiber stub 16, respectively.

In general, the fiber alignment and retainer member 221 and the anvil member 260 are configured and dimensioned to define an arc or splice chamber 222 with fiber alignment (e.g., alignment of end portions 14A and 16A). In exemplary embodiments, splice chamber 222 includes a first electrode port or channel 265, and a second electrode port or channel 267. In general, electrode channels 265, 267 are configured and dimensioned to allow at least of portion of electrodes 320A, 320B, respectively, to be inserted within at least a portion of channels 265, 267, as discussed further below. In exemplary embodiments, electrode channels 265, 267 (e.g., substantially cylindrical electrode channels) are defined by housing 213, retainer member 221 and/or anvil member 260. Fiber alignment and retainer member 221 also is typically configured to retain, position and/or house the ferrule 15 at least partially disposed within the connector housing 213.

Figure 17:
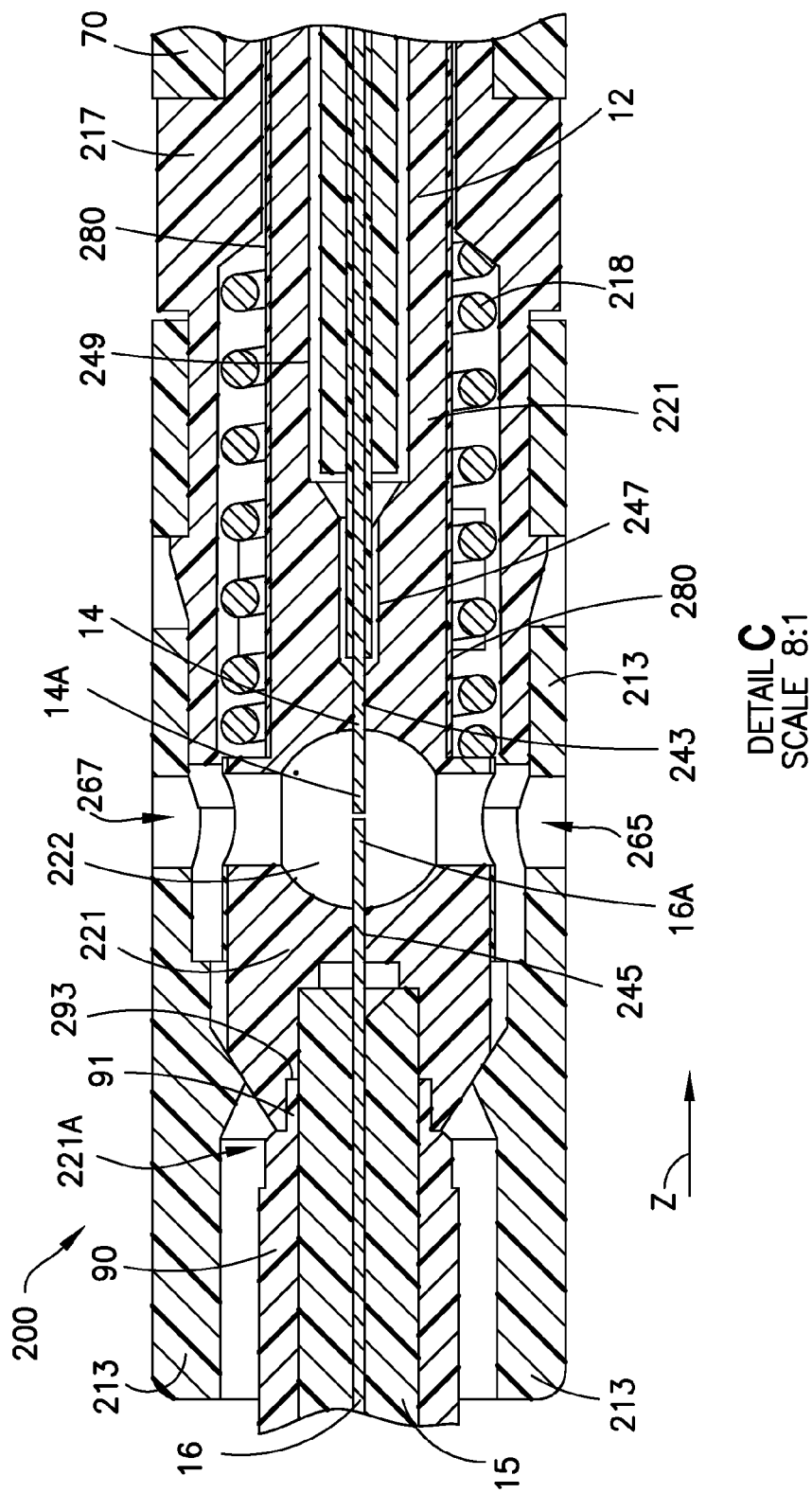
FIG. 17 is a partial exploded view of the exemplary connector member of FIG. 15A.
Figure 18:
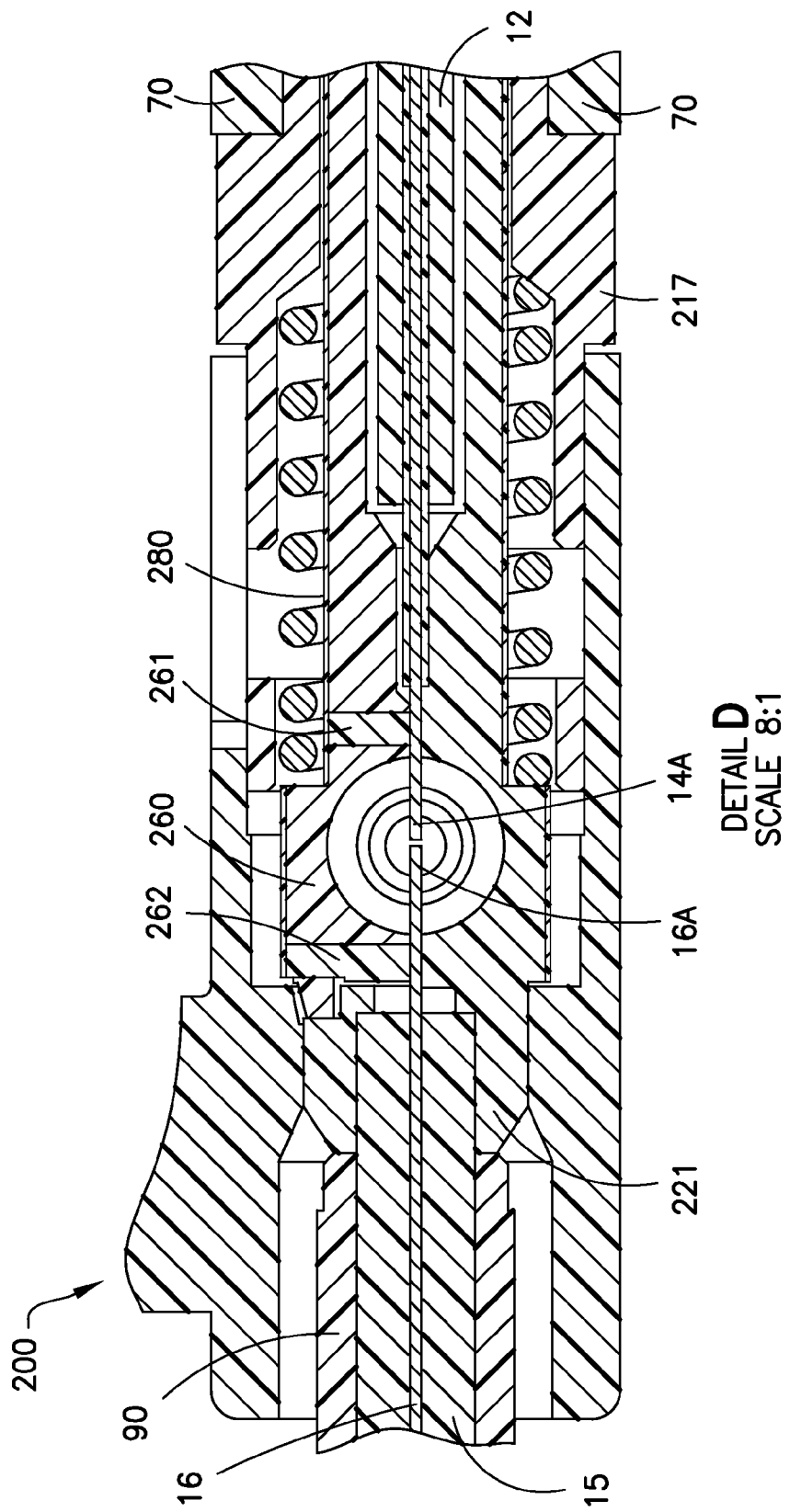
FIG. 18 is a partial exploded view of the exemplary connector member of FIG. 16A.

In one embodiment and as shown in FIGS. 17-18, fiber alignment and retainer member 221 defines (i) at least a portion of a first alignment lumen, channel or tube 243 inside connector housing 213 that is configured to receive and/or align at least a portion of bare fiber portion 14, (ii) at least a portion of a second alignment lumen, channel or tube 247 inside connector housing 213 that is configured to receive and/or align at least a portion of fiber portion 14C, fiber portion 14C having the buffer or insulation portion of cable 12 removed therefrom and including a coating or the like on fiber portion 14C, and (iii) at least a portion of a third alignment lumen, channel or tube 249 at least partially inside connector housing 213 that is configured to receive and/or align at least a portion of cable 12.

Similarly, anvil member 260 typically defines: (i) at least a portion of second alignment lumen 247 inside connector housing 213 that is configured to receive and/or align at least a portion of fiber portion 14C, and (ii) at least a portion of third alignment lumen 249 at least partially inside connector housing 213 that is configured to receive and/or align at least a portion of cable 12.

In exemplary embodiments, fiber alignment and retainer member 221 also defines a fourth alignment lumen, channel or tube 245 inside connector housing 213 that is configured to receive and/or align at least a portion of fiber stub 16. In general, lumens 243, 245, 247 and/or 249 are configured and dimensioned to receive and/or align end portions 14A and 16A in close proximity to one another and in close proximity to the pair of electrodes 320A, 320B (discussed below in connection with splice device 11) at or near the splice chamber 222.

As noted, an integrated visual fault locator (VFL) 50 (FIG. 3) may be used to ensure that end portion 14A of the bare fiber portion 14 is in proper location, contact and/or position with respect to the end portion 16A of the internal fiber stub 16. For example, a photo-detector or the like may be mounted with respect to and/or associated with VFL 50 (e.g., via an optical splitter) and be utilized to detect the back-reflected light from VFL 50 in splice chamber 222 to facilitate the proper positioning of end portions 14A, 16A relative to one another. Alternatively, a photo-detector or the like associated with second body member 24 may be positioned/mounted under adapter member 226 to detect the light from the VFL 50 in splice chamber 222 to facilitate the proper positioning of end portions 14A, 16A relative to one another.

Similar to as described above, fusion splice device or arc generator device 11 typically includes internal circuitry for generating a fusion splice arc or electrical arc which is transferred to the connector splice chamber 222 via electrodes 320A, 320B, as discussed further below. In one embodiment, the internal circuitry of the fusion splice device 11 sends/applies electrical energy to/across electrodes 320A, 320B to create a fusion splice arc in the splice chamber 222, thereby causing the end portion 16A of the fiber stub 16 and the end portion 14A of the cleaved fiber end 14 to heat and fuse together.

In exemplary embodiments, first body member 23 is configured and dimensioned to support at least a portion of optical cable 12 and/or bare fiber portion 14, and second body member 24 is configured and dimensioned to support, house and/or receive connector member 200. Similar to as previously described, actuator member 25 is configured and adapted to slowly advance the bare fiber portion 14 supported by the first body member 23 relative to the splice chamber 222 of connector member 200 during the fusing process.

In one embodiment, fusion splice device 11 typically includes connector insert member/adapter 226 (e.g., an interchangeable block or adapter plate) that is sized, shaped, and configured to receive, house and/or support connector member 200 within and with respect to the second body member 24, and to position and orient the connector member 200 appropriately with respect to the optical cable 12, including with respect to the bare fiber portion 14 of optical cable 12. As noted above, connector insert member 226 may be removed and replaced with one or more of a plurality of differently-configured connector insert members or blocks (e.g., insert members 26 or 126) to advantageously facilitate use of device 11 with respect to a wide variety of differently-configured optical fiber connector members (e.g., connector members 10 or 100).

As similarly noted above, first and second cover members 29, 30 are each typically sized, shaped, and configured to interoperate with the first and second body members 23, 24, respectively, to provide a means for securing the optical cable 12 and the connector member 200 to the first and second body member 23, 24 (e.g., for purposes of facilitating field termination of the optical cable 12 with respect to the connector member 200.

Figure 19:
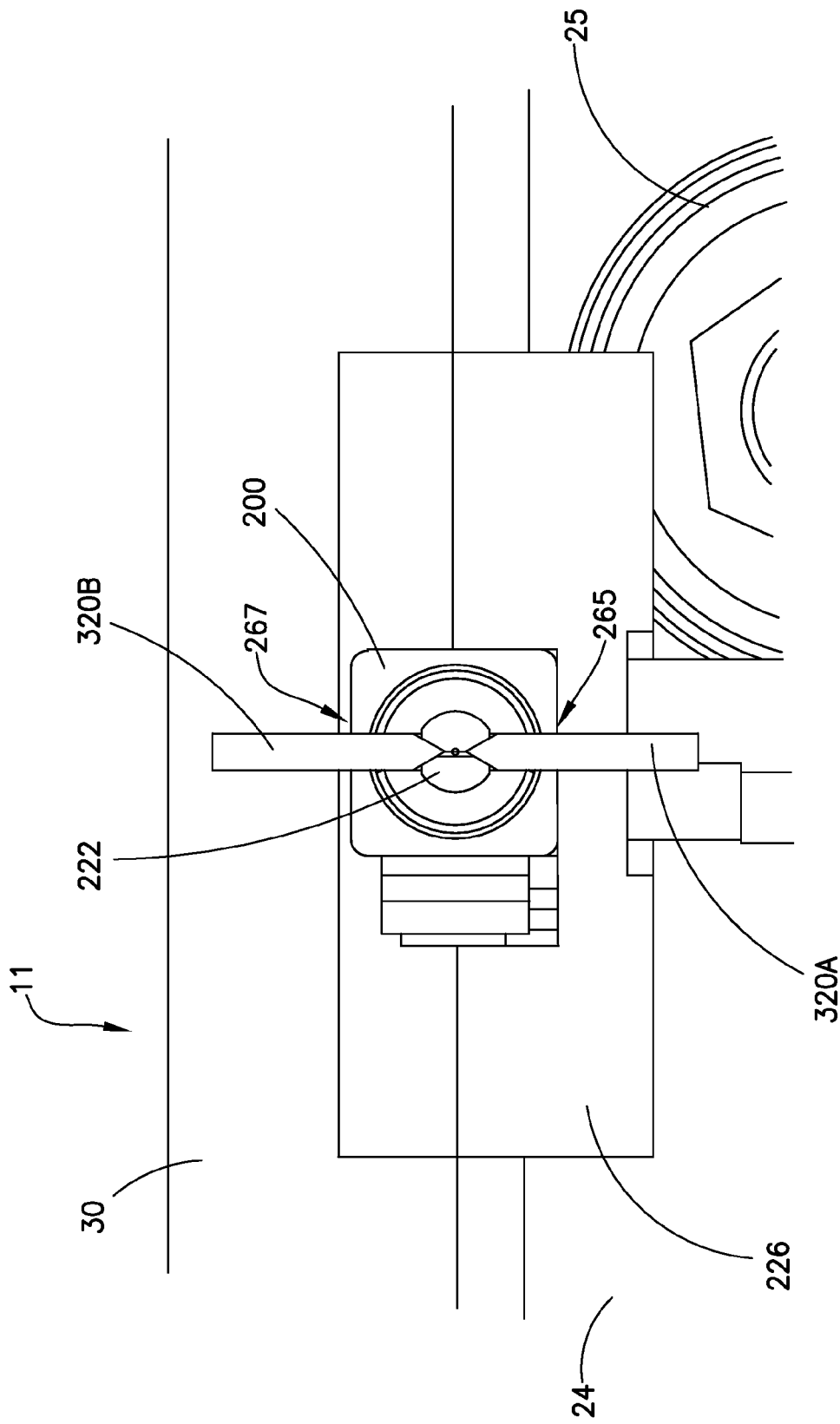
FIG. 19 is a front cross-sectional view of the exemplary fusion splice device of FIG. 5 with the connector member of FIG. 15 inserted therein.

In certain exemplary embodiments, second cover member 30 includes electrode 320B mounted with respect to second cover member 30, and second body member 24 includes electrode 320A mounted with respect to second body member 24 (FIGS. 3 and 19). In exemplary embodiments, when cover member 30 is open and after connector member 200 has been housed/positioned with respect to the second body member 24 via connector insert member/adapter 226, at least a portion of electrode 320A of second body member 24 is inserted and/or positioned within at least a portion of electrode channels 265 so that at least a portion of electrode 320A is in close proximity to (e.g., adjacent to) splice chamber 222.

After second cover member 30 is closed, at least a portion of electrode 320B of second cover member 30 is inserted and/or positioned within at least a portion of electrode channels 267 so that at least a portion of electrode 320B is in close proximity to (e.g., adjacent to) splice chamber 222 (FIG. 19). In exemplary embodiments, as the second cover member 30 is closed and as at least a portion of electrode 320B is inserted within electrode channel 267, the electrodes 320A, 320B are configured and dimensioned to engage the anvil member 260 and move (e.g., ramp or cam) the anvil member 260 upwards away from end portion 16A. In general, this movement of anvil member 260 (e.g., movement of about 0.005 inches) creates a gap that opens up and/or defines at least a portion of lumen/channel 243, so that at least a portion of bare fiber portion 14 may be received within now open lumen/channel 243. In general, after fusion of end portions 14A, 16A, the electrodes 320A, 320B are removed from channels 265, 267, thereby causing (e.g., via compression/engagement from resilient member 280) the anvil member 260 (e.g., compression member 261 and/or 262) to engage with and/or press against at least a portion of end portions 14A and/or 16A, fiber portion 14, and/or against fiber alignment and retainer member 221. In general, resilient member 280 is positioned at least partially around retainer member 221 and anvil member 260. In exemplary embodiments, resilient member 280 is a resilient tubular member, e.g., a heat shrink sleeve or overmolded tubular member or the like, although the present disclosure is not limited thereto.

In operation, fusion splice device 11 may be utilized to vertically, horizontally, and/or longitudinally align connector member 200 and at least a portion of the bare fiber portion 14 of optical cable 12 relative to each other to ensure that the end portion 14A of the bare fiber portion 14 is properly positioned in and/or adjacent to splice chamber 222 of connector member 200. In certain embodiments, the electrodes 320A, 320B may then be activated/energized via the internal circuitry within device 11 to commence the fusion process. During the fusion process, actuator member 25 may be activated to controllably (e.g., slowly) advance the bare fiber portion 14 with respect to the splice chamber 222 to facilitate effective fusion.

A user may utilize connector member 200 (or connector 10 or 100, discussed above) and fusion splice device 11 to terminate or fuse a broad variety of optical fibers. In exemplary embodiments, first a user would place or position the connector member 200 into connector insert member 226 of second body member 24 of the fusion splice device 11, and the stripped and cleaved fiber portion 14 would be inserted into or positioned relative to first body member 23 (e.g., a sled member), the first body member 23 being attached to the second body member 24 (FIG. 3). The first and second cover members 29, 30 would then be closed, thereby: (i) positioning/housing the two electrodes 320A, 320B in contact or close proximity with the splice chamber 222 (FIGS. 17-19), and (ii) engaging electrodes 320A, 320B with the anvil member 260 to move (e.g., ramp or cam) the anvil member 260 upwards away from end portion 16A to create a gap that opens up and/or defines at least a portion of lumen/channel 243, so that at least a portion of bare fiber portion 14 may be received within now open lumen/channel 243.

A switch 33 would then be pushed or activated by a user. In exemplary embodiments, after the switch 33 was activated, first the fusion splice device 11 would be configured and adapted to advance the first body member 23 via the adjustment member 27 until the end portion 14A of the bare fiber portion 14 is in contact/engagement with or in close proximity to the end portion 16A of the internal fiber stub 16.

As shown in FIGS. 17 and 19, as the end portion 14A of fiber portion 14 moves into the body of the connector member 200, it is aligned with and/or positioned with respect to the end portion 16A of the fiber stub 16 through the alignment channel or lumen 243, and thereby is also in close proximity to the splice chamber 222 (and to electrodes 320A, 320B).

In exemplary embodiments, after the first body member 23 was advanced until the end portion 14A of the bare fiber portion 14 is in contact/engagement with or in close proximity to the end portion 16A of the internal fiber stub 16, then the fusion splice device 11 is configured and adapted to set/retract the first body member 23 back a pre-defined distance away from the second body member 24, thereby retracting the end portion 14A away from the end portion 16A a pre-defined distance (e.g., about 2 mm). This retraction of end portion 14A away from the end portion 16A a pre-defined distance thereby allows for the cleaning of the fibers 14A, 16A by the fusion splice device 11. In exemplary embodiments, after the end portion 14A was retracted away from the end portion 16A a pre-defined distance, the internal circuitry of the fusion splice device 11 is configured and adapted to apply a pre-fusion electrical arc (e.g., for about $1/10^{th}$ of a second) to the splice chamber 222 and to the end portions 14A, 16A via electrodes 320A, 320B to clean the end portions 14A, 16A.

In exemplary embodiments, after a brief delay after the pre-fusion arc was applied (e.g., a delay of about 0.5 seconds), the fusion splice device 11 would then be configured and adapted to begin applying an electrical arc to end portions 14A, 16A via electrodes 320A, 320B, thereby causing the end portion 16A of the fiber stub 16 and the end portion 14A of the cleaved fiber end 14 to begin to heat and fuse together. In this position and after the electrical arc was applied to end portions 14A, 16A for a pre-determined amount of time (e.g., for about $3/10^{th}$ of a second), the fusion splice device 11 would then be configured and adapted to advance the first body member 23 (e.g., by use of the actuator member 25) toward the second body member 24 at a predetermined rate and for a pre-determined distance (e.g., at a rate of about 0.2 mm/sec, and over a distance of about 0.065 mm+/−0.01 mm) as the electrical arc is applied to the end portions 14A, 16A via electrodes 320A, 320B, thereby causing the end portion 16A of the fiber stub 16 and the end portion 14A of the cleaved fiber end 14 to begin to heat and fuse together. In exemplary embodiments, the resultant fused connector meets the current TIA/EIA-604-10; 568-C.3; 455-1, -4, -5, -6, -13, -21, -36, -107, -171, -188 and/or GR-326-CORE Standards.

In exemplary embodiments, after the fusion splice device 11 advanced the first body member 23 toward the second body member 24 at a pre-determined rate and for a pre-determined distance while applying the electrical arc to end portions 14A, 16A, the device 11 would then be configured and adapted to check/test the splice loss of the fusion weld of the fused connector (e.g., connector member 200 fused to cable 12). If the splice loss is less than 0.5 dB, the device 11 would then be configured and adapted to check/test the proof test level of the fusion weld to 20 kpsi. However, if the splice loss of the fusion weld were greater than 0.5 dB, then an LED light associated with the device 11 would indicate that the fused connector had an unacceptable/inadequate fusion weld. If the proof test level of the fusion weld were determined by device 11 to be less than 20 kpsi, then another LED light associated with the device 11 would indicate that the fused connector had an unacceptable/inadequate fusion weld. However, if the proof test level of the fusion weld was acceptable/adequate up to 20 kpsi, then another LED light associated with device 11 would indicate that the fused connecter had an acceptable/adequate fusion weld. The device 11 would then record the above results and then shut down. In general, a user would then open cover members 29, 30 and remove the fused connector from device 11.

In exemplary embodiments, the fused connector typically has a cap member 90 or the like mounted with respect to connector member 200 (e.g., mounted with respect to fiber alignment and retainer member 221, connector housing 213, and/or ferrule 15) (see, e.g., FIGS. 15-18). In general, mounted cap member 90 or the like is configured and dimensioned to substantially prevent dust, dirt and/or debris or the like from entering/contaminating connector member 200.

In exemplary embodiments and as shown in FIGS. 15A, 17 and 22, cap member 90 typically includes at least one extending member 91 that is configured and dimensioned to engage with or mount with respect to at least one notch or slot 293 of fiber alignment and retainer member 221. In one embodiment, cap member 90 includes two extending members 91 that extend from an outer end 90A of cap member 90, and retainer member 221 includes two notches 293 that are positioned along and/or extend from an outer end 221A of retainer member 221. In general, when cap member 90 is mounted with respect to connector member 200, at least a portion of each extending member 91 is configured to be positioned within at least a portion of a notch 293 (FIG. 17).

In exemplary embodiments, outer end 221A of retainer member 221 includes six side portions 250, with each side 250 typically tapering toward outer end 221A (e.g., inward toward the center of outer end 221A). As such, at least a portion of outer end 221A is substantially hexagonal in shape, although it is noted that that outer end 221A may take the form of other polygonal shapes or the like.

In exemplary embodiments, after the fused connector 200 was removed from device 11, and after cap member 90 was mounted with respect to connector member 200 so that at least a portion of each extending member 91 is positioned within at least a portion of a notch 293, a user is thereby allowed to move cap member 90 in the general direction of Arrow Z of FIG. 17 so that the cap member 90 forced the retainer member 221 and anvil member 260 a distance in the general direction of Arrow Z relative to housing 213 while also compressing spring member 218 in the direction of Arrow Z. Once the retainer member 221 and anvil member 260 were moved within housing 213 in the direction of Arrow Z so that the side portions 250 were substantially free from engaging and/or contacting housing 213, the user would then be free to rotate (e.g.,) 360° the cap member 90 axially, which thereby rotated the retainer member 221 (and anvil member 260) axially.

In exemplary embodiments, after the fused connector 200 was removed from device 11 and after cap member 90 was mounted with respect to connector member 200, a user would move cap member 90/retainer member 221 in the direction of Arrow Z relative to housing 213 and then rotate the cap member 90/retainer member 221 axially (e.g., about 60°) so that the electrode channel portions 265, 267 of retainer member 221 were not aligned with the electrode channel portions 265, 267 of housing 213 to thereby close off splice chamber 222. A user would then release or discontinue pressure on the cap member 90 to thereby allow the cap member 90 to move cap member 90/retainer member 221 (and anvil member 260) in the opposite direction of Arrow Z relative to housing 213 (and via spring member 218 un-compressing/moving in the opposite direction of Arrow Z) until the side portions 250 engaged and/or contacted housing 213 (FIG. 21).

In exemplary embodiments, the retainer member 221 and the resilient member 280 each include transparent or translucent sections that are configured and adapted to allow a user to utilize VFL 50 or the like to view the splice chamber 222 after the retainer member 221 and anvil member 260 have been rotated via cap member 90 so that the electrode channel portions 265, 267 of retainer member 221 were not aligned with the electrode channel portions 265, 267 of housing 213 to thereby close off splice chamber 222.

Figure 27:
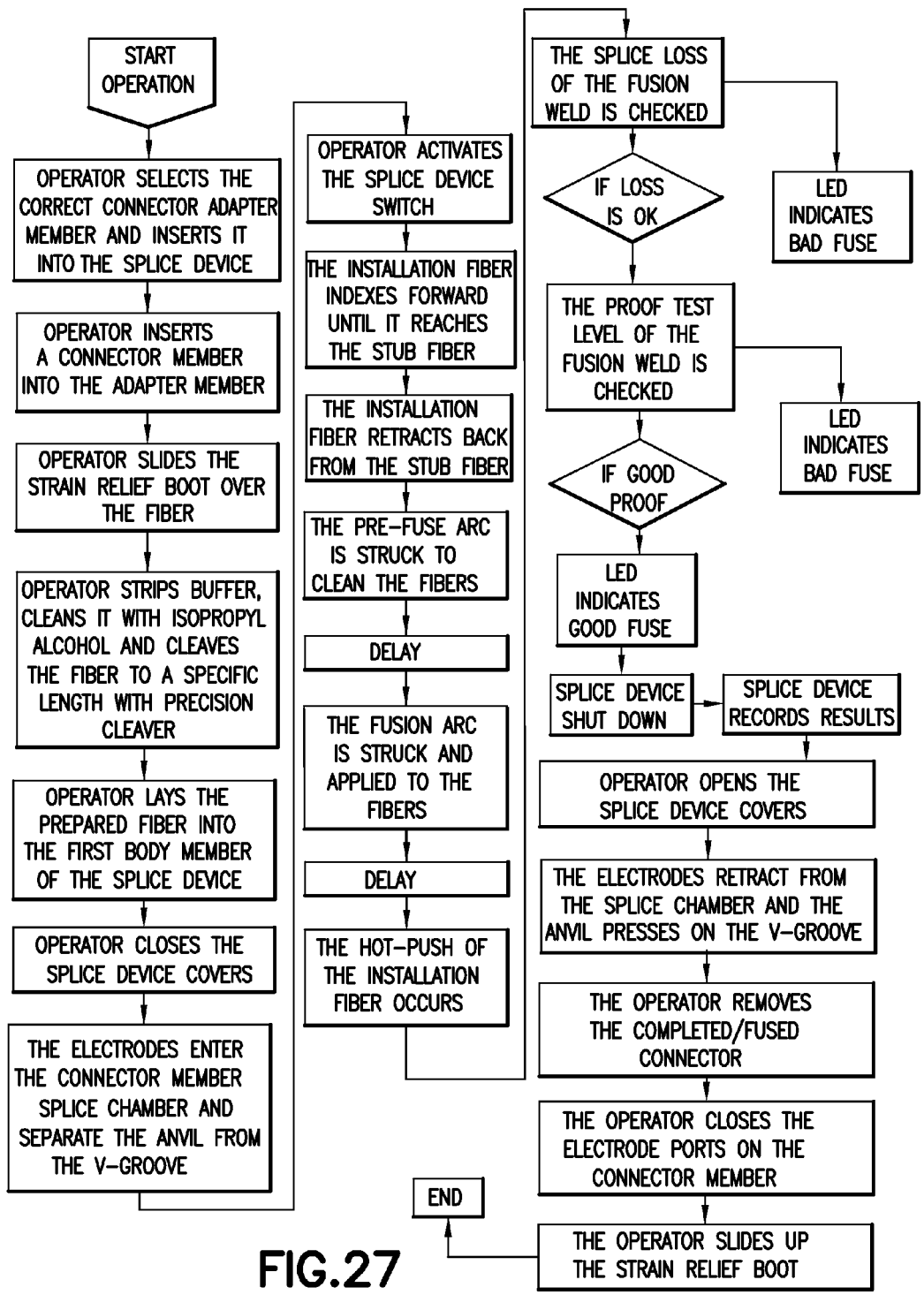
FIG. 27 is a flow chart of an exemplary process for terminating or fusing optical fibers or the like, in accordance with an exemplary embodiment of the present disclosure.
Figure 28:
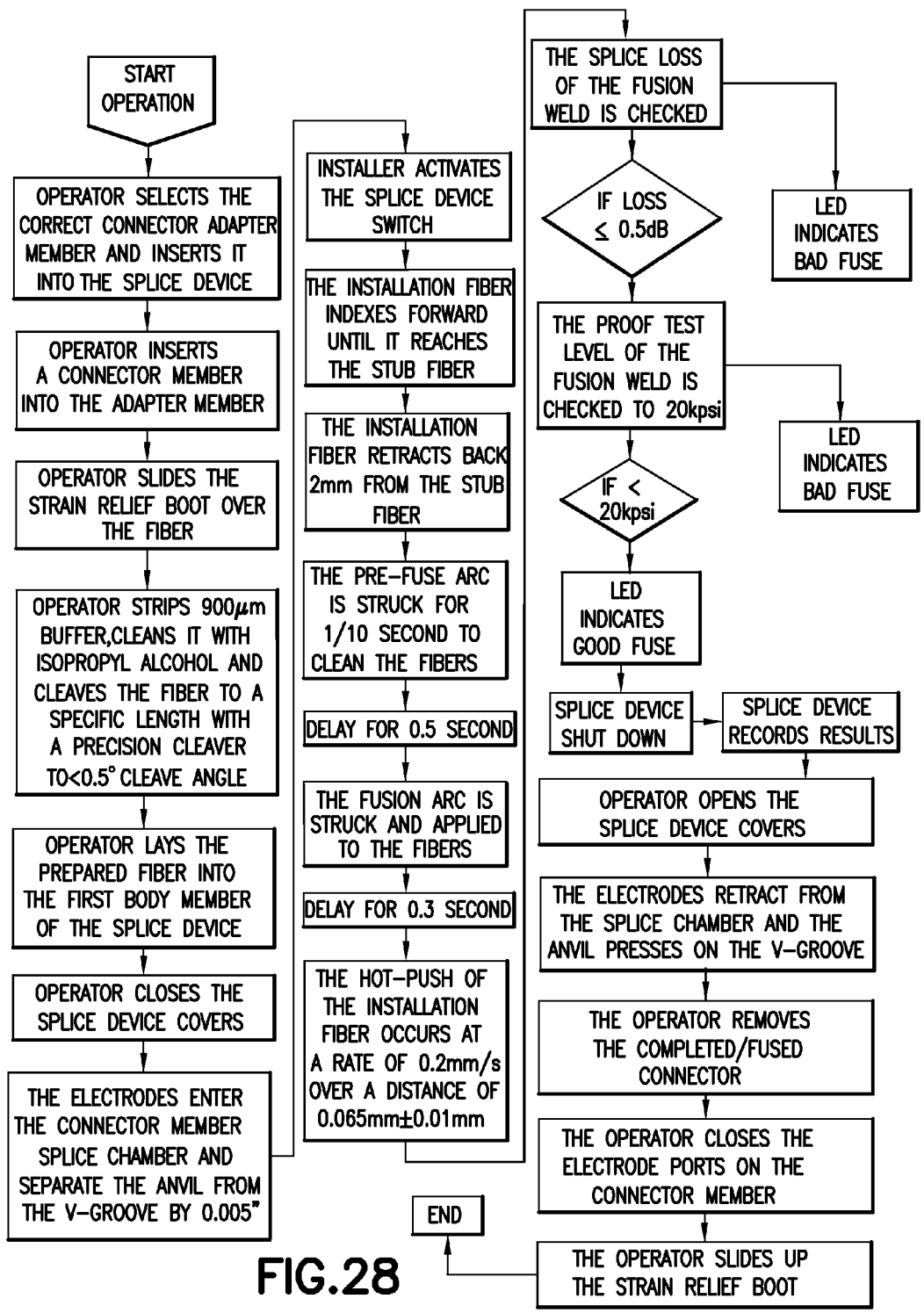
FIG. 28 is another flow chart of another exemplary process for terminating or fusing optical fibers or the like, in accordance with another exemplary embodiment of the present disclosure.

In accordance with exemplary embodiments of the present disclosure, FIGS. 27 and 28 depict flow charts of exemplary processes for terminating or fusing optical fibers or the like utilizing the exemplary connector members (e.g., connector member 10, 100, 100' or 200) and fusion splice device 11 as described above. It is noted that a user may utilize some or all of the listed process steps in FIGS. 27 and/or 28 to terminate or fuse a broad variety of fibers with the exemplary connector members and splice devices as disclosed in the present disclosure.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A fusion splice device, comprising:
(i) a first body member mounted with respect to a first cover member, the first body member configured to support at least a portion of an optical fiber with respect to a connector member, (ii) a second body member mounted with respect to a second cover member, the second body member configured to house the connector member with respect to the optical fiber, and (iii) an actuator member mounted with respect to one of the first and second body members, the actuator member configured to adjust the position of the first body member relative to the second body member, thereby allowing a user to position at least a portion of a bare fiber portion of the optical fiber within the connector member with an end portion of the bare fiber portion proximal to: (a) a splice chamber of the connector member, and (b) an end of a fiber stub of a ferrule, the ferrule at least partially disposed within the connector member;
a first spring-loaded electrical contact mounted with respect to the second cover member; and
a second spring-loaded electrical contact mounted with respect to the second body member;
wherein when the first and second electrical contacts are positioned proximal to the splice chamber and electrical energy is applied to the first and second electrical contacts, the end portion of the bare fiber portion and the end of the fiber stub heat and fuse together.

2. The fusion splice device of claim 1, further comprising a connector adapter member configured to receive and support the connector member relative to the second body member, the connector adapter member being selectively removable and replaceable with a differently-configured instance of the connector adapter member for receiving and supporting a differently-configured instance of the connector member.

3. The fusion splice device of claim 1, further comprising a visual fault locator mounted with respect to the second body member and a photo-detector mounted with respect to the visual fault locator, the photo-detector configured to detect light from the visual fault locator in the splice chamber to facilitate the proper positioning of the end portion of the bare fiber portion proximal to the end of the fiber stub.

4. The fusion splice device of claim 1, further comprising an adjustment member mounted with respect to one of the first and second body members, the adjustment member configured to adjust the position of the first body member relative to the second body member;
wherein at least one of the adjustment member and the actuator member is associated with at least one shaft member, the at least one shaft member mounted with respect to the first and second body members; and
wherein: (i) at least one of the adjustment member and the actuator member, and (ii) the at least one shaft member, are configured to interoperate with the first and second body members to adjust the position of the first body member relative to the second body member.

5. A fusion splice device comprising:
(i) a first body member mounted with respect to a first cover member, the first body member configured to support at least a portion of an optical fiber with respect to a connector member, (ii) a second body member mounted with respect to a second cover member, the second body member configured to house the connector member with respect to the optical fiber, and (iii) an actuator member mounted with respect to one of the first and second body members, the actuator member configured to adjust the position of the first body member relative to the second body member, thereby allowing a user to position at least a portion of a bare fiber portion of the optical fiber within the connector member with an end portion of the bare fiber portion proximal to: (a) a splice chamber of the connector member, and (b) an end of a fiber stub of a ferrule, the ferrule at least partially disposed within the connector member;
wherein after at least a portion of the bare fiber portion is positioned within the connector member with the end portion of the bare fiber portion proximal to: (i) the splice chamber, and (ii) the end of the fiber stub, a switch mounted with respect to the first or second body member is configured and adapted to be activated by a user to retract the first body member away from the second body member a pre-defined distance via the actuator member to allow a pre-fusion electrical arc to then be applied to first and second electrodes positioned proximal to the splice chamber to clean the end portion of the bare fiber portion and the end of the fiber stub.

6. The fusion splice device of claim 5, wherein after the pre-fusion electrical arc is applied to the first and second electrodes and after a pre-determined delay, electrical energy is applied across the first and second electrodes for a pre-determined amount of time to cause the end portion of the bare fiber portion and the end of the fiber stub to begin to heat and fuse together, and (ii) the first body member is advanced via the actuator member toward the second body member at a pre-determined rate and for a pre-determined distance as electrical energy is applied across the first and second electrodes to heat and fuse the end portion of the bare fiber portion and the end of the fiber stub together.

7. The fusion splice device of claim 1, wherein fusion of an optical fiber connector assembly is facilitated, said optical fiber connector assembly including:
the connector member, the connector member having a housing and a fiber retainer member housed within at least a portion of the housing, the fiber retainer member defining: (i) at least a portion of the splice chamber, and (ii) at least a portion of at least first and second lumens that extend proximal to the splice chamber;
the ferrule at least partially disposed within the housing, the ferrule having a fiber stub that extends from a first end to a second end, at least a portion of the fiber stub positioned within the second lumen with the second end of the fiber stub proximal to the splice chamber; and
the optical fiber including the bare fiber portion that terminates at the end portion, at least a portion of the bare fiber portion positioned within the first lumen with the end portion of the bare fiber portion proximal to: (i) the splice chamber and, (ii) the second end of the fiber stub.

8. The fusion splice device of claim 5, further comprising a connector adapter member configured to receive and support the connector member relative to the second body member, the connector adapter member being selectively removable and replaceable with a differently-configured instance of the connector adapter member for receiving and supporting a differently-configured instance of the connector member.

9. The fusion splice device of claim 5, further comprising a visual fault locator mounted with respect to the second body member and a photo-detector mounted with respect to at least one of the visual fault locator and the second body member, the photo-detector configured to detect light from the visual fault locator in the splice chamber to facilitate the proper positioning of the end portion of the bare fiber portion proximal to the end of the fiber stub.

10. The fusion splice device of claim 5, further comprising an adjustment member mounted with respect to one of the first and second body members, the adjustment member configured to adjust the position of the first body member relative to the second body member;

wherein at least one of the adjustment member and the actuator member is associated with at least one shaft member, the at least one shaft member mounted with respect to the first and second body members; and wherein: (i) at least one of the adjustment member and the actuator member, and (ii) the at least one shaft member, are configured to interoperate with the first and second body members to adjust the position of the first body member relative to the second body member.

11. The fusion splice device of claim 5, wherein the first electrode is mounted with respect to the second cover member and the second electrode is mounted with respect to the second body member.

12. The fusion splice device of claim 1, wherein after at least a portion of the bare fiber portion is positioned within the connector member with the end portion of the bare fiber portion proximal to: (i) the splice chamber, and (ii) the end of the fiber stub, and before electrical energy is applied to the first and second electrical contacts to heat and fuse the end portion of the bare fiber portion and the end of the fiber stub together, a switch mounted with respect to the first or second body member is configured and adapted to be activated by a user to retract the first body member away from the second body member a pre-defined distance via the actuator member to allow a pre-fusion electrical arc to then be applied to first and second electrodes positioned proximal to the splice chamber to clean the end portion of the bare fiber portion and the end of the fiber stub.

13. The fusion splice device of claim 12, wherein after the pre-fusion electrical arc is applied to the first and second electrodes and after a pre-determined delay, electrical energy is applied across the first and second electrodes for a pre-determined amount of time to cause the end portion of the bare fiber portion and the end of the fiber stub to begin to heat and fuse together, and the first body member is advanced via the actuator member toward the second body member at a pre-determined rate and for a pre-determined distance as electrical energy is applied across the first and second electrodes to heat and fuse the end portion of the bare fiber portion and the end of the fiber stub together.

\* \* \* \* \*